Jan. 2, 1968

J. N. LAUZON ET AL 3,361,247

ARTICLE SORTING SYSTEM AND METHOD

Filed March 28, 1966

INVENTORS
JAMES NELSON LAUZON
RAYMOND J. SANDNER
JORGEN S. BILDSOE
BY

*Burton & Parker*

ATTORNEYS

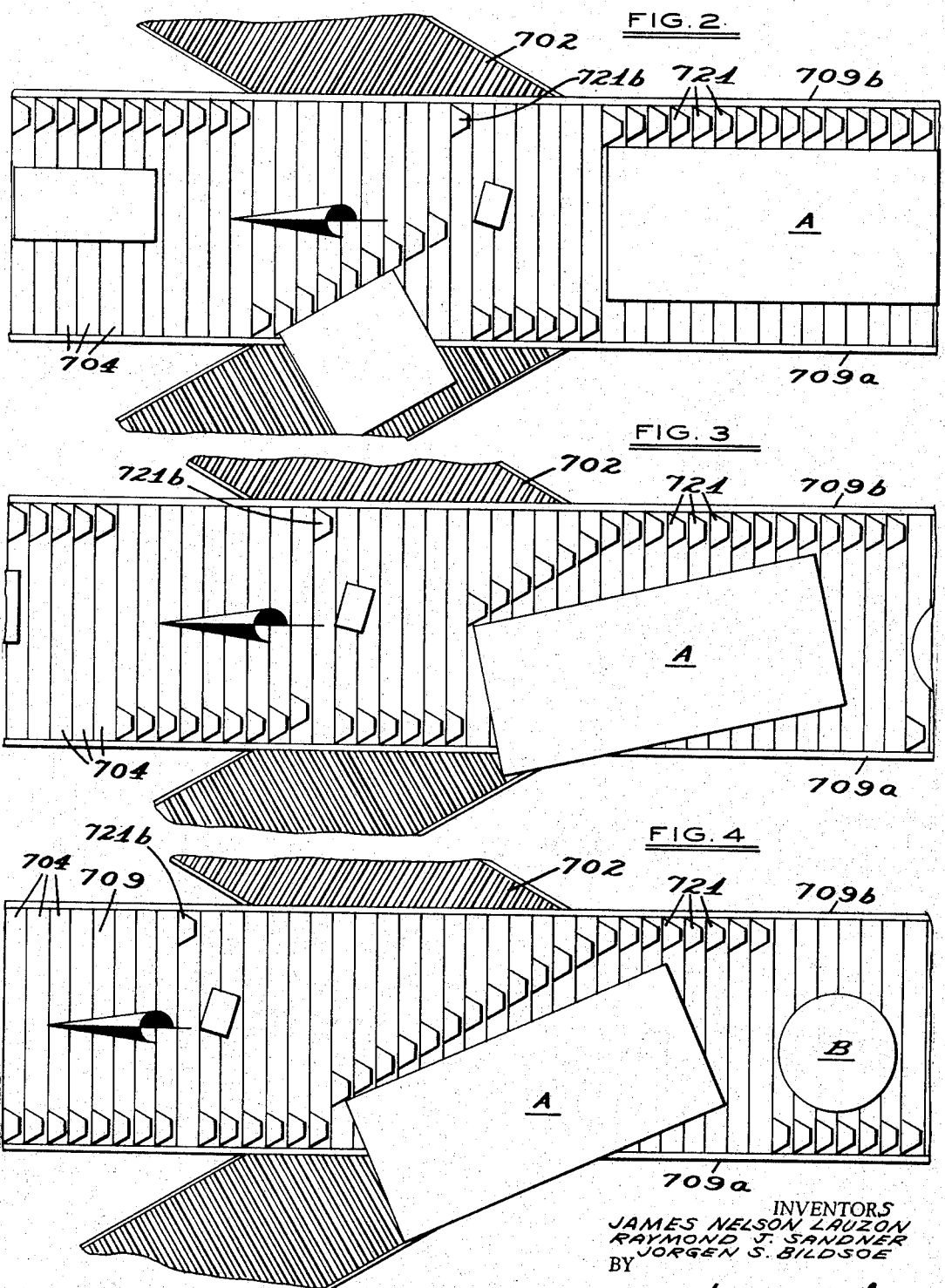

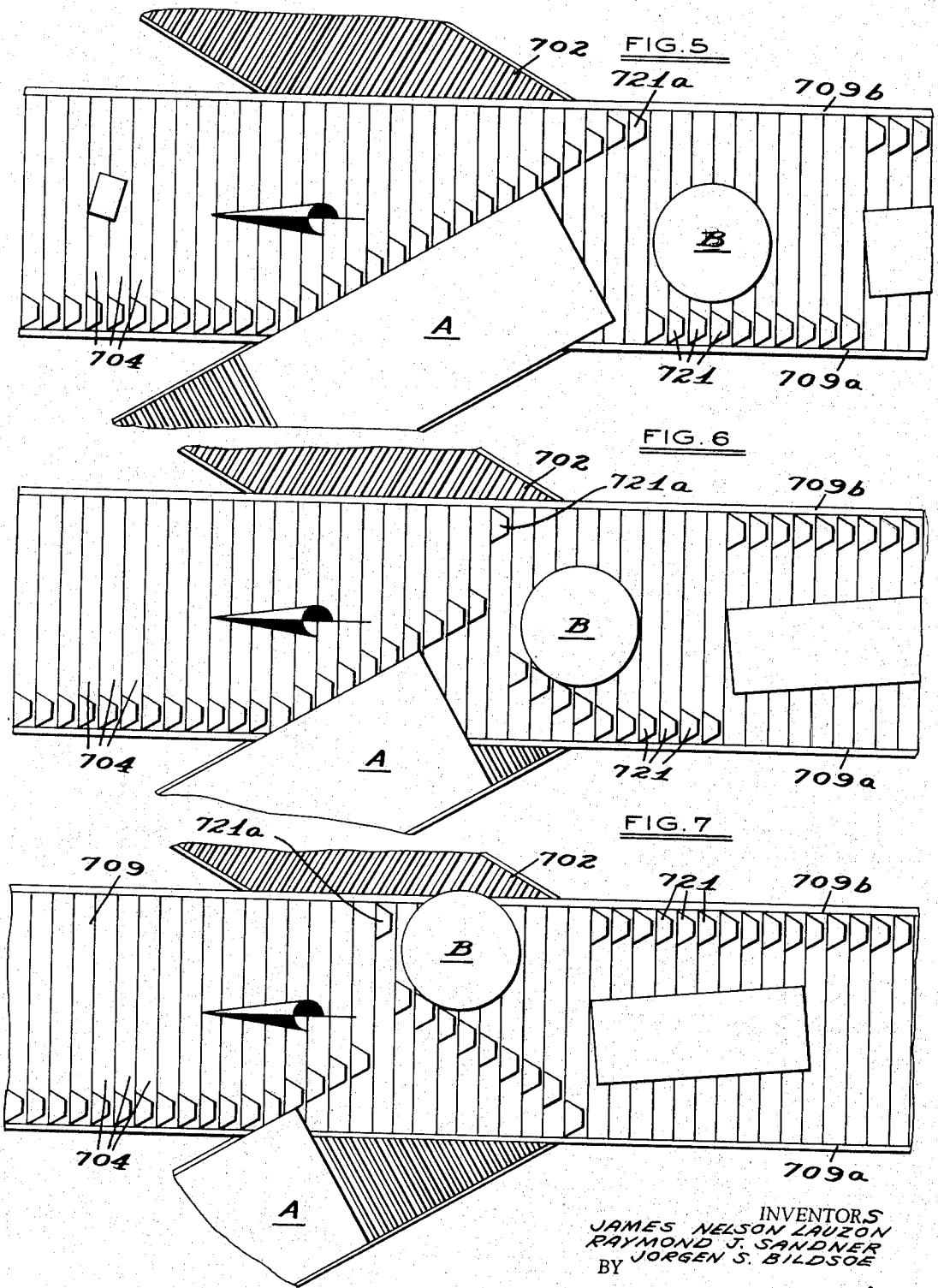

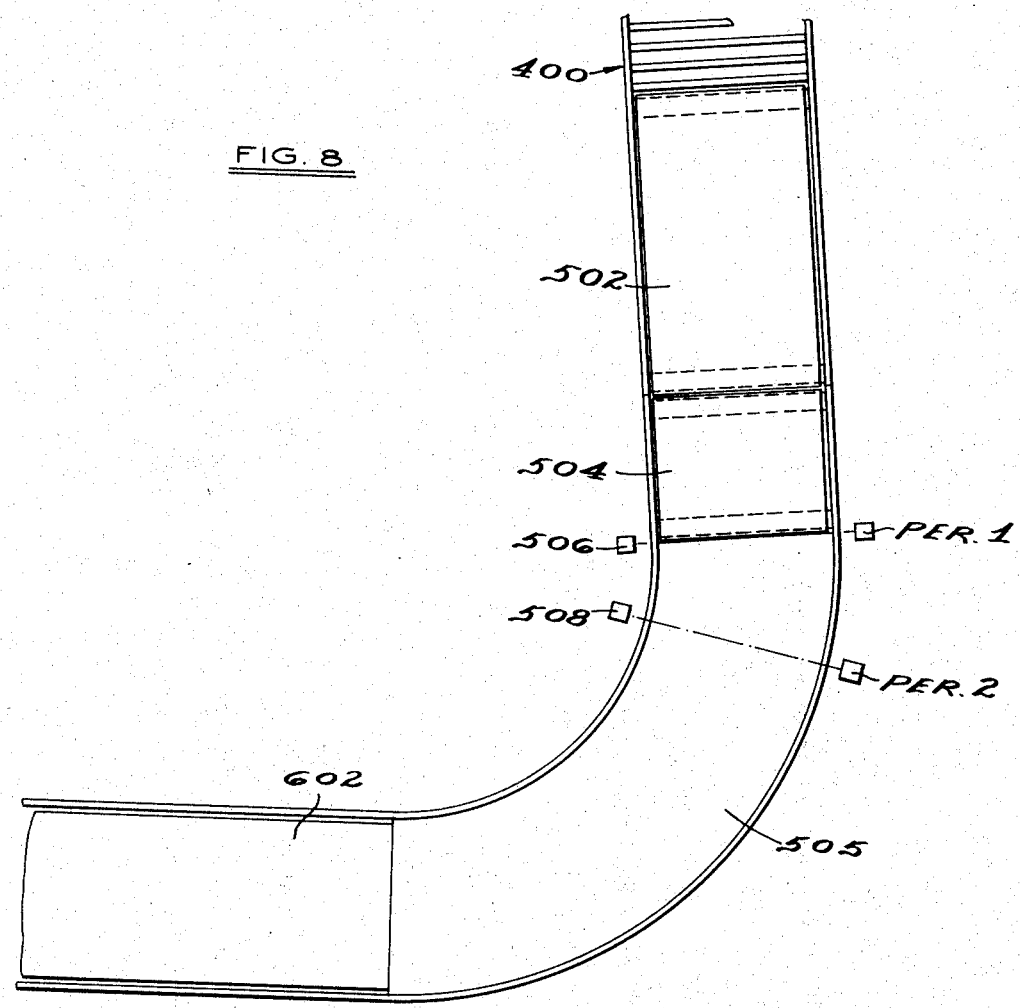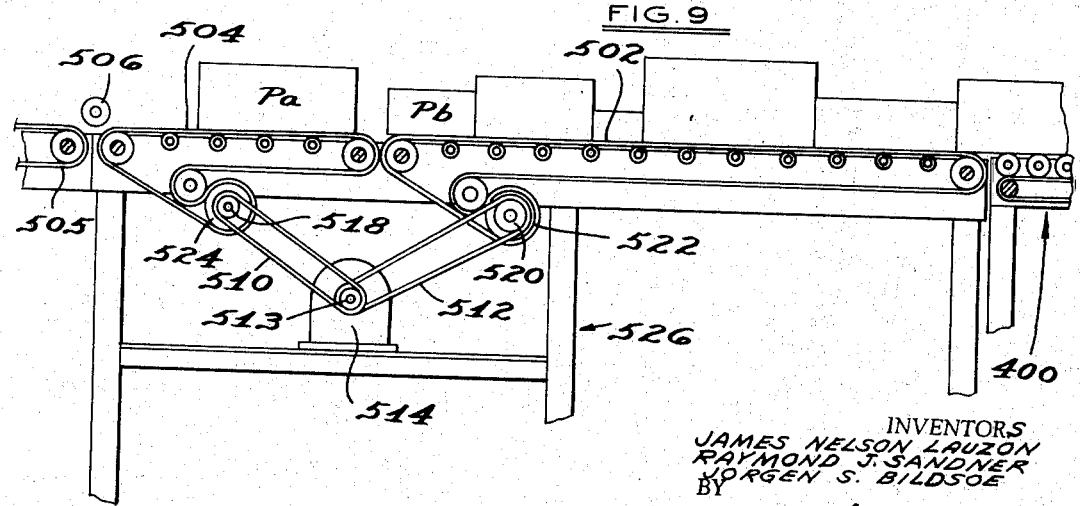

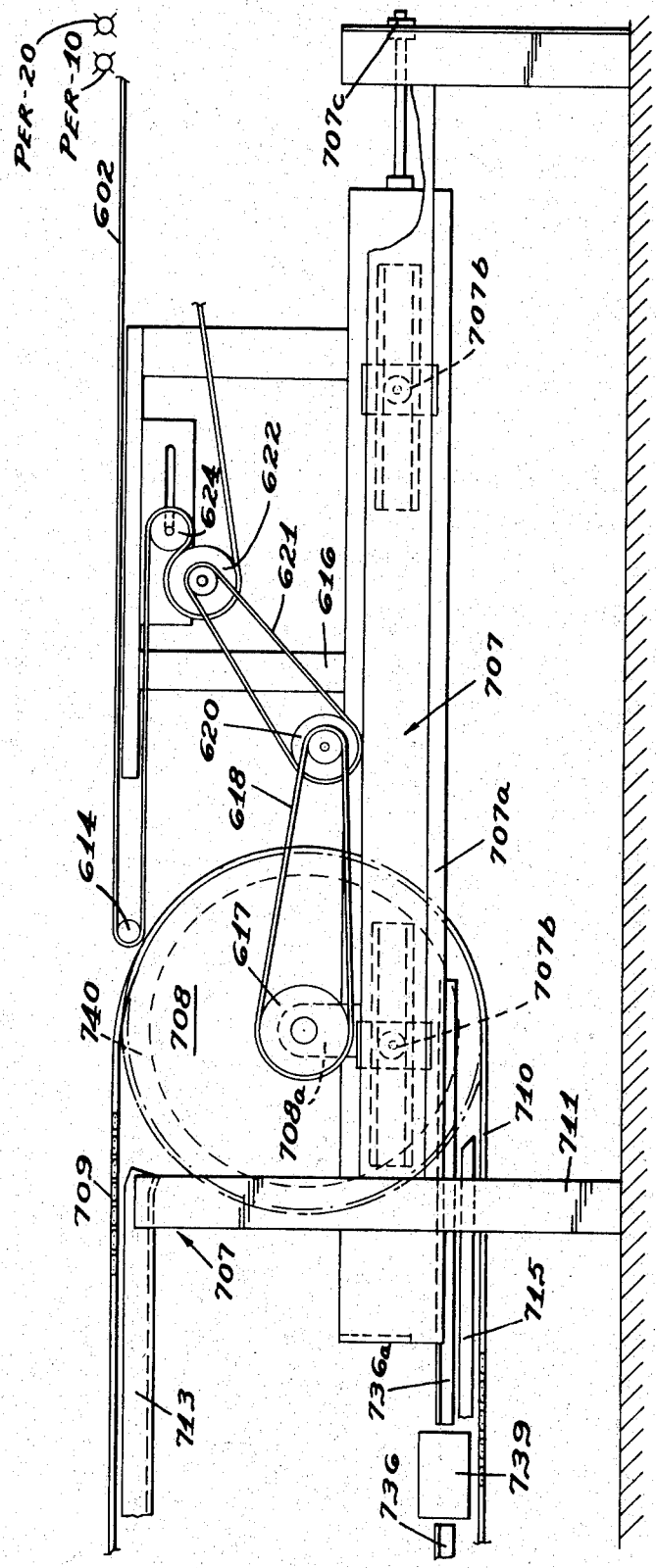

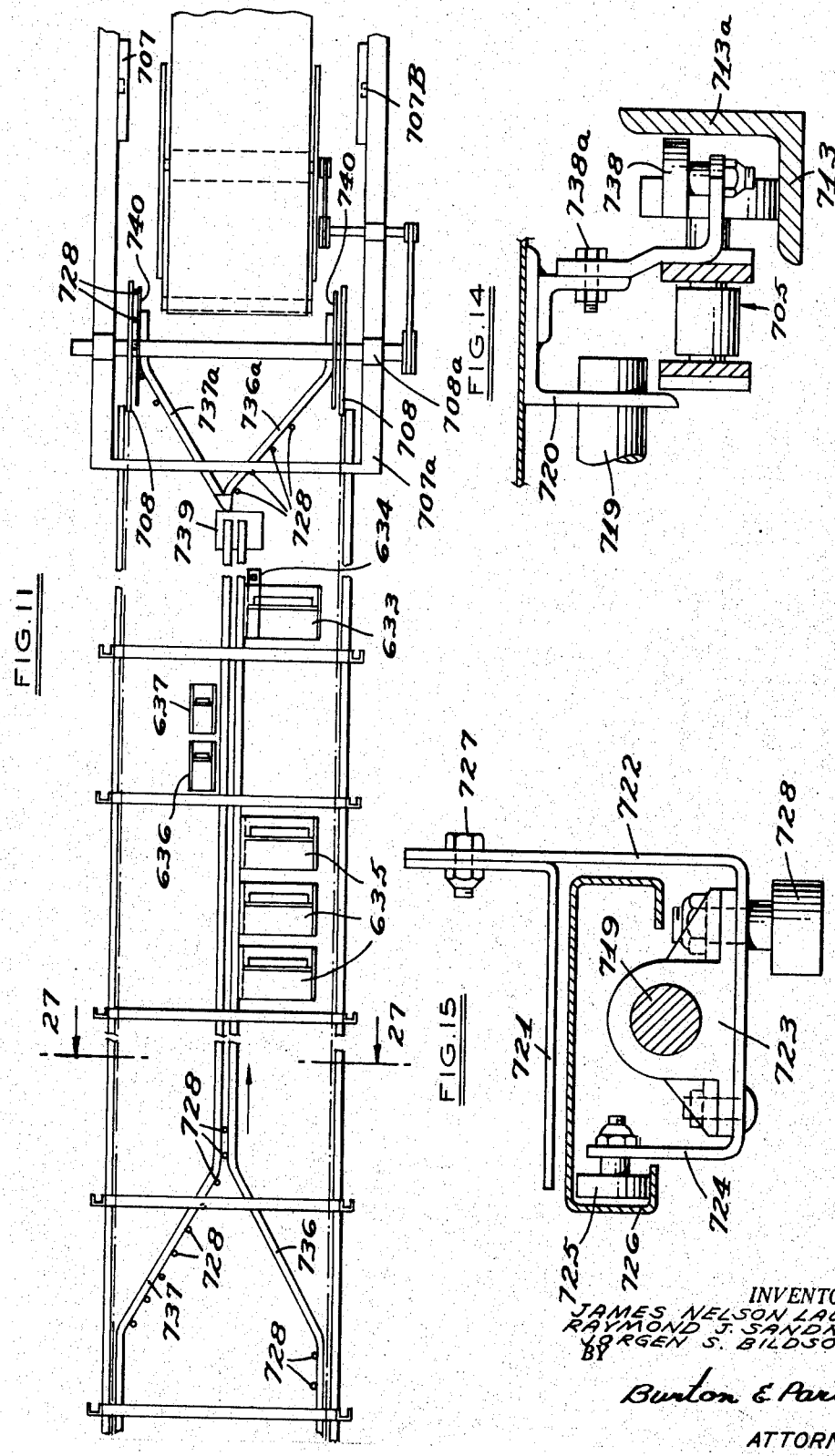

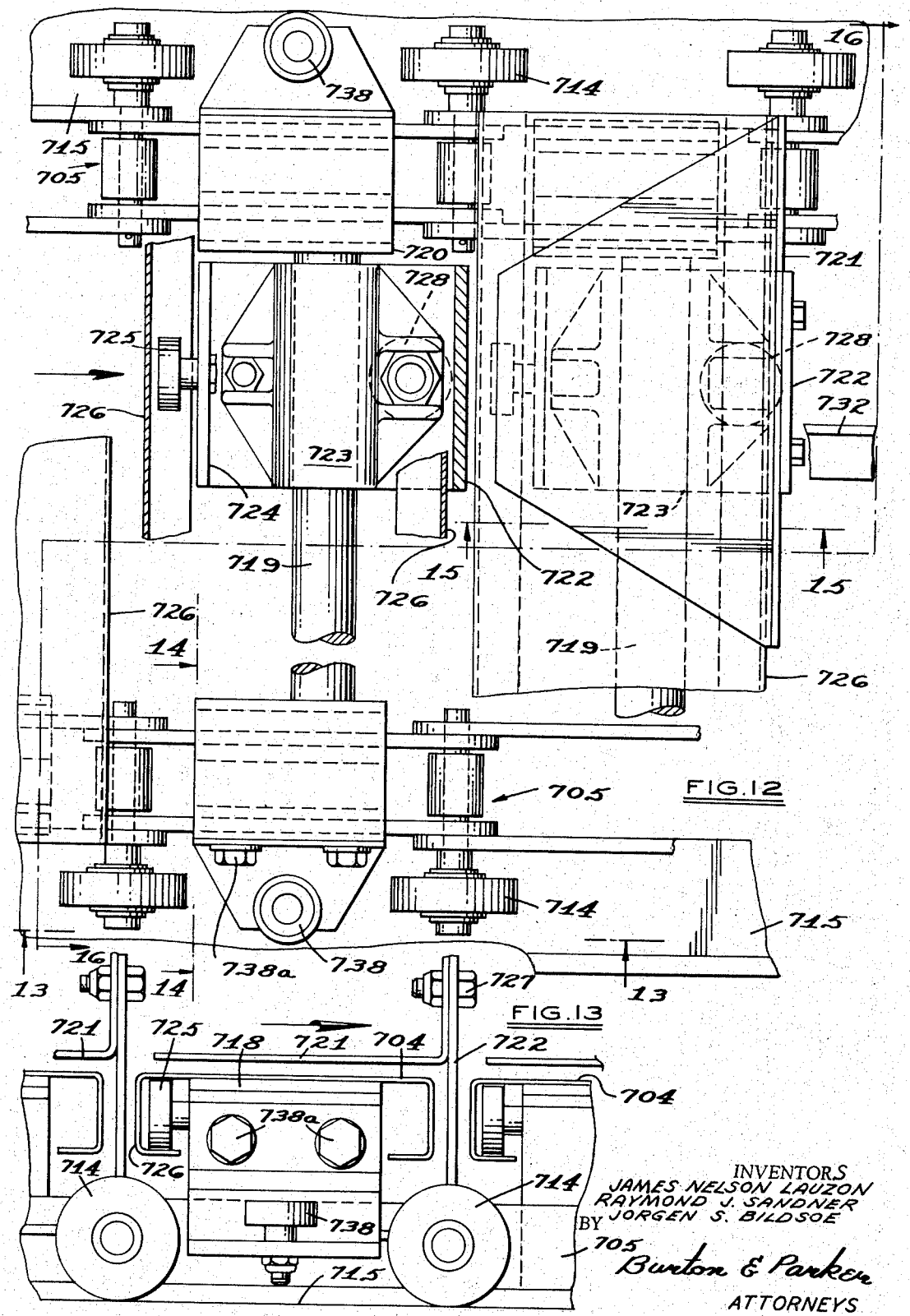

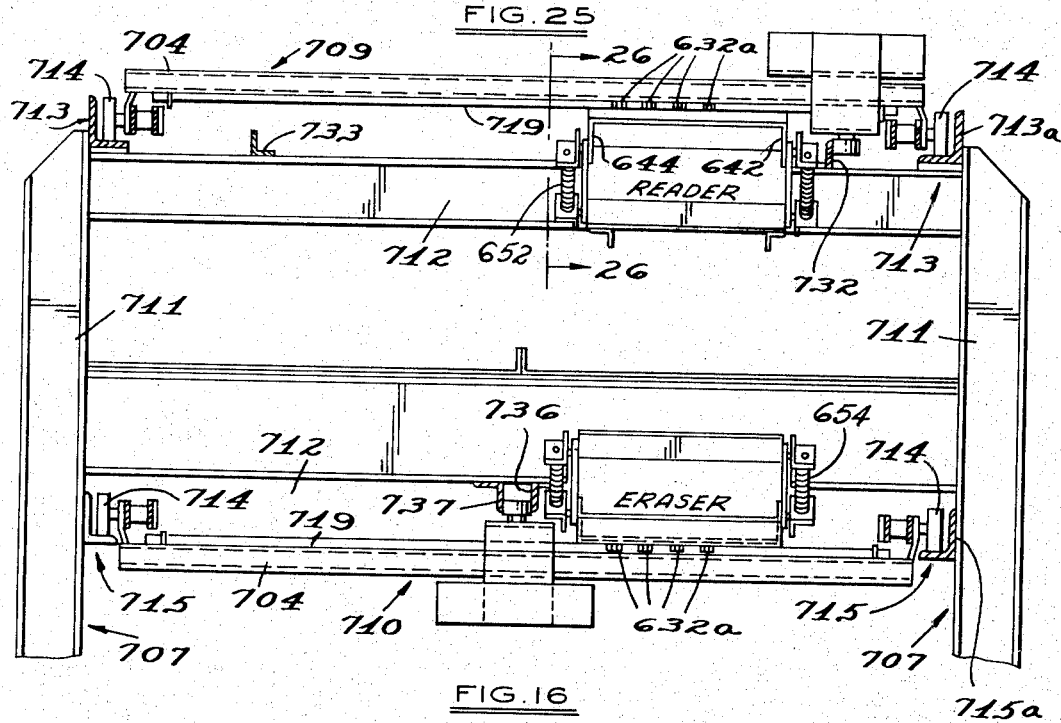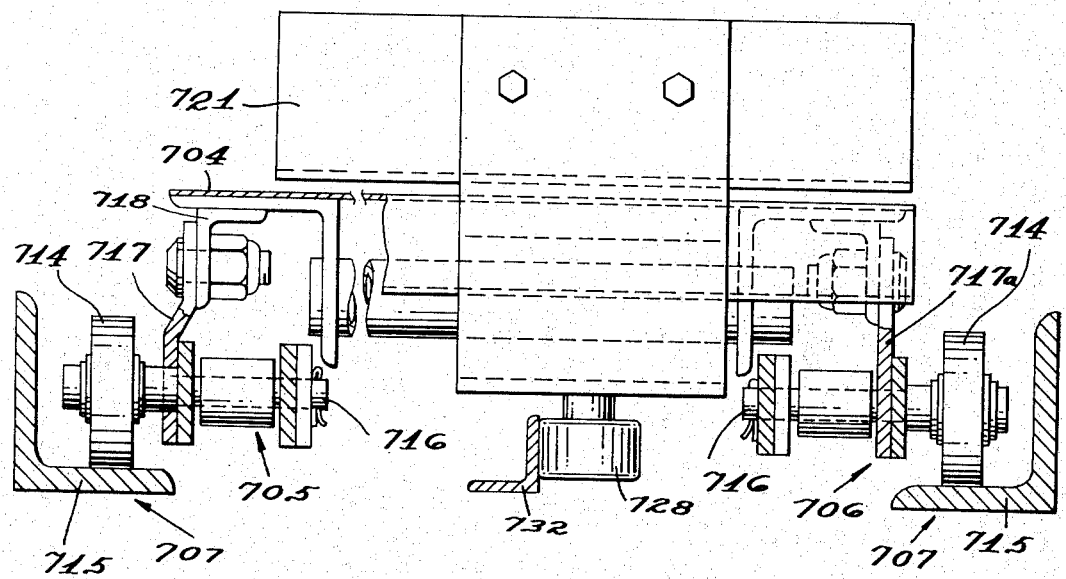

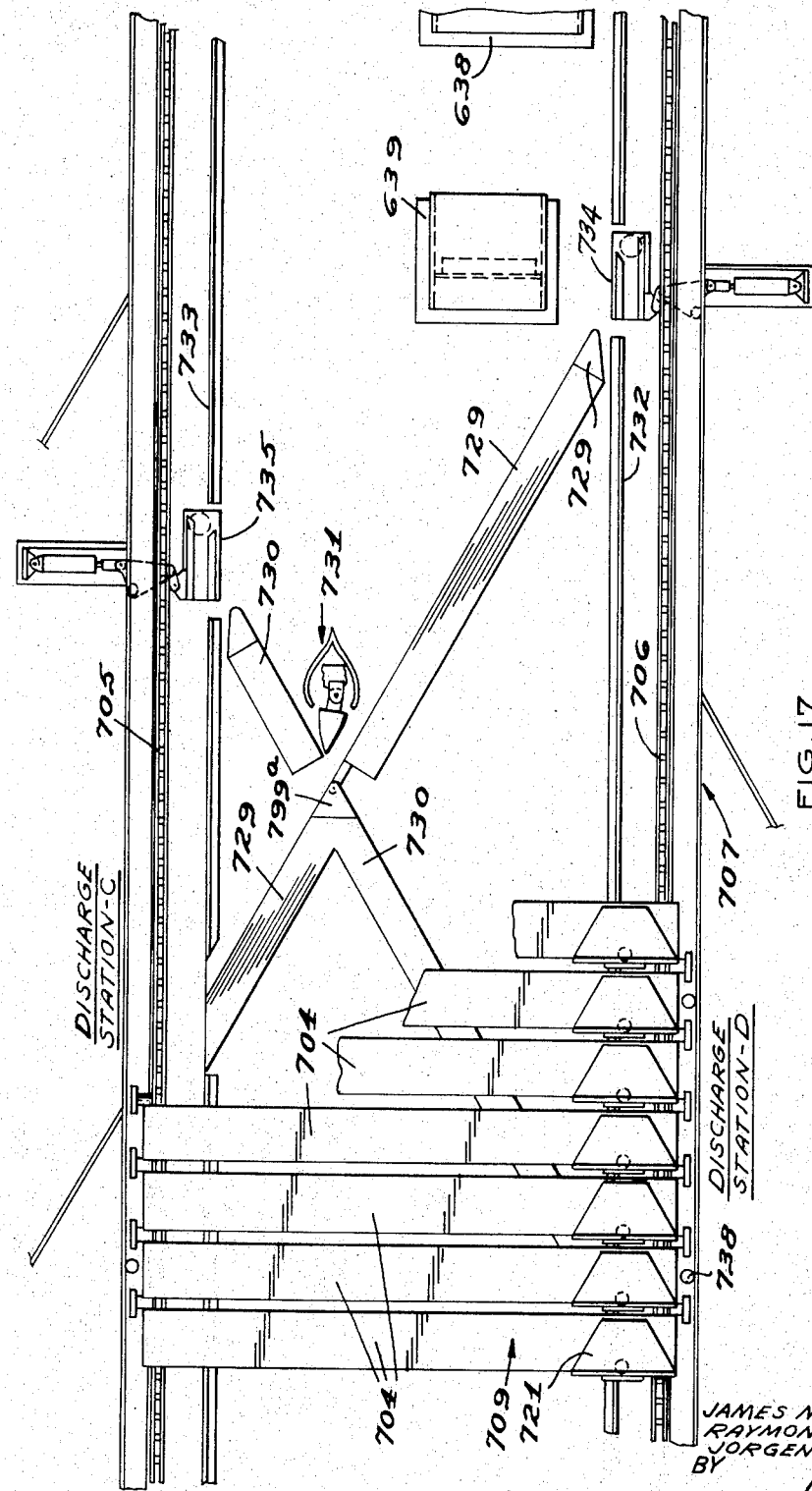

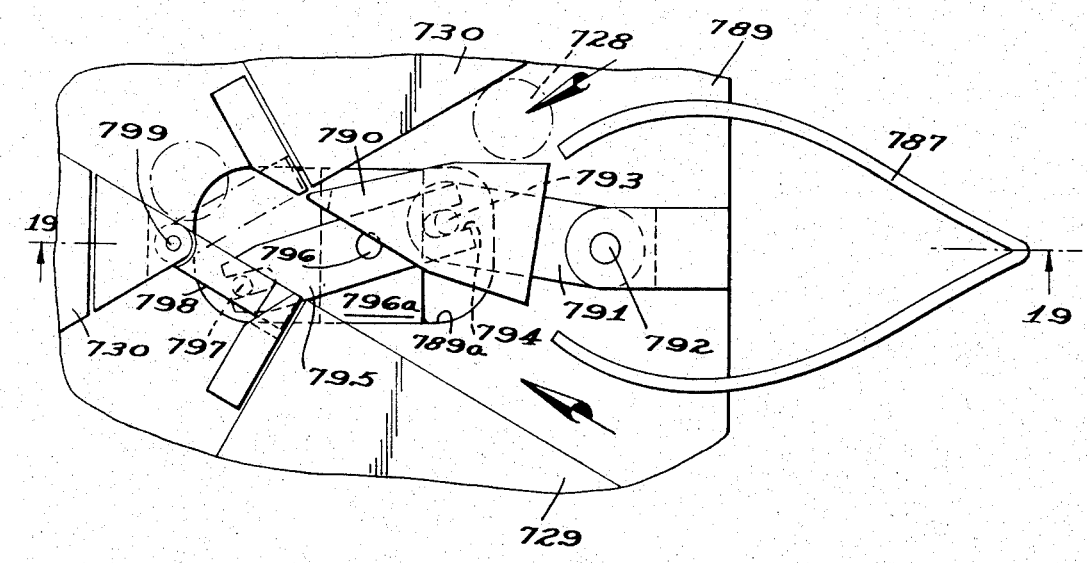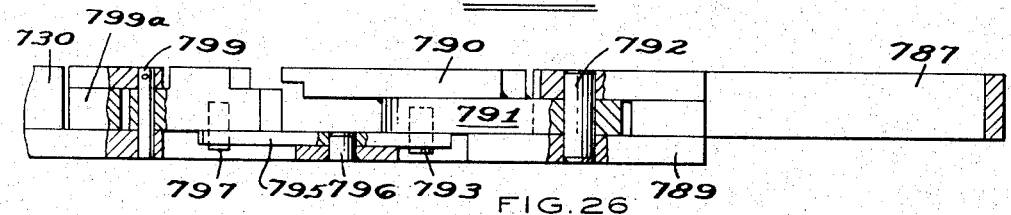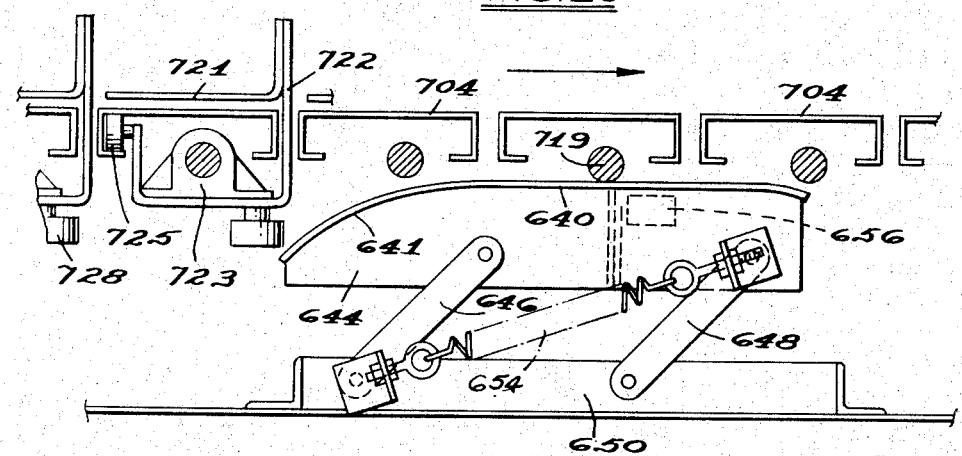

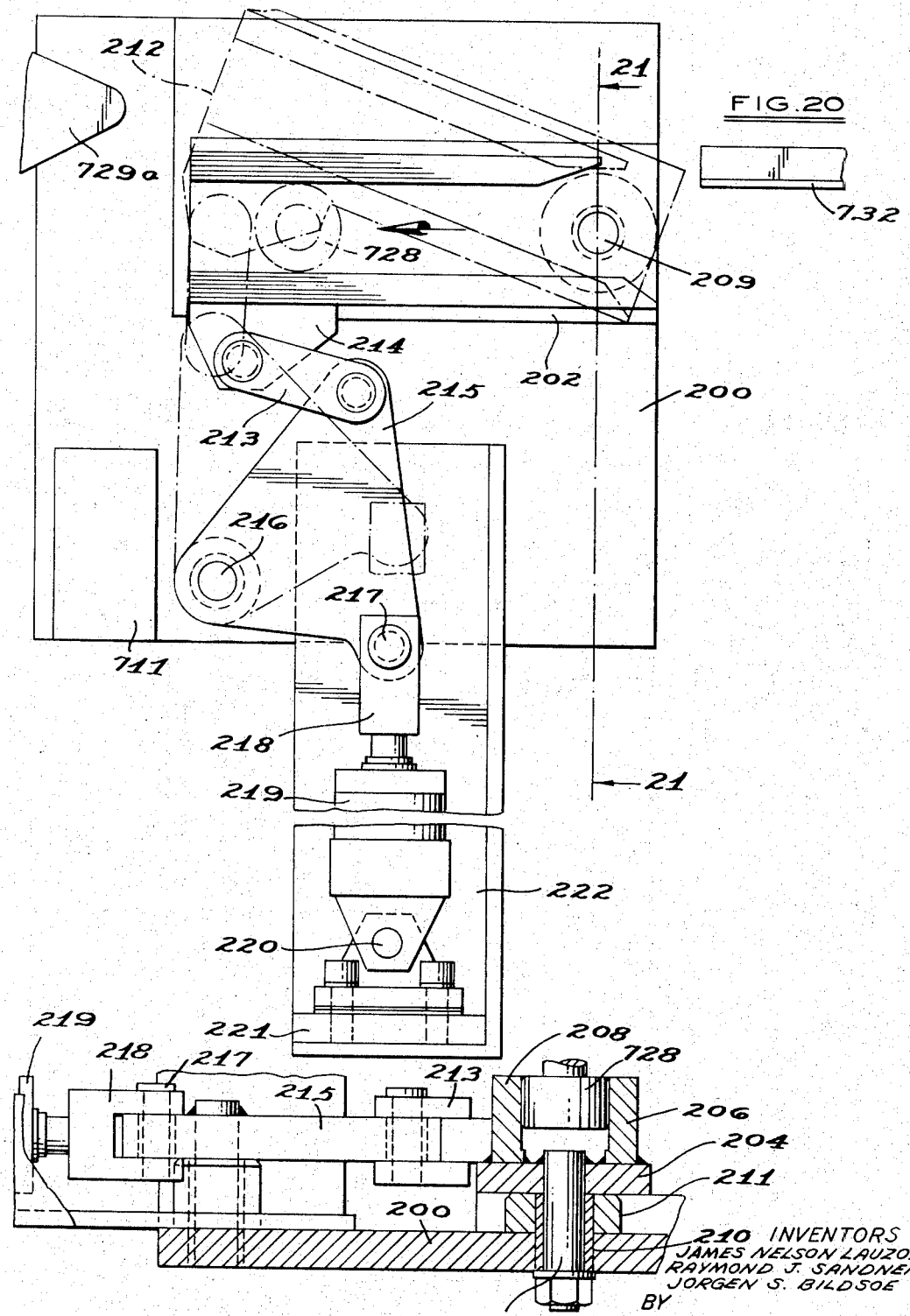

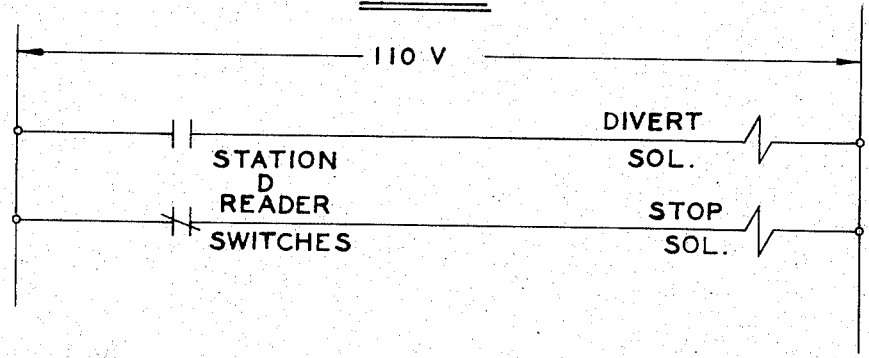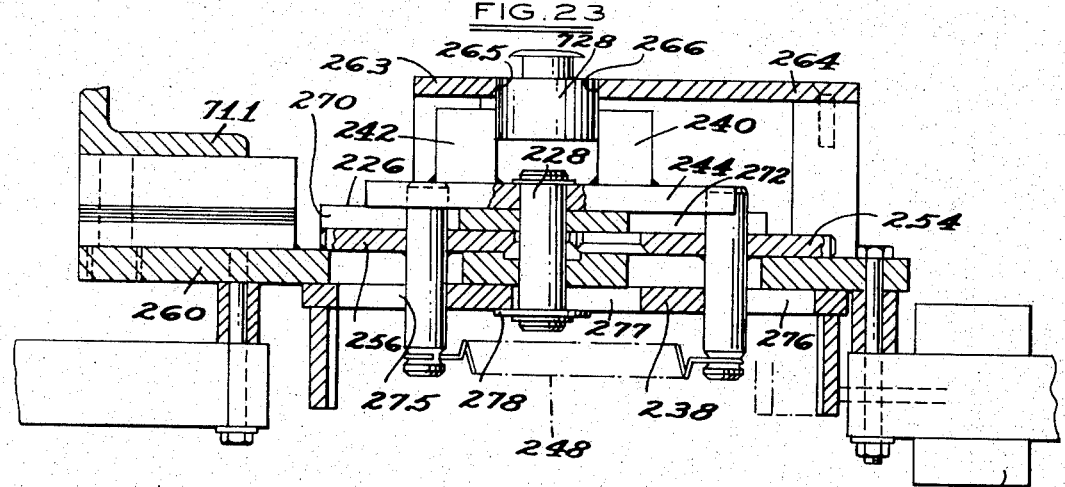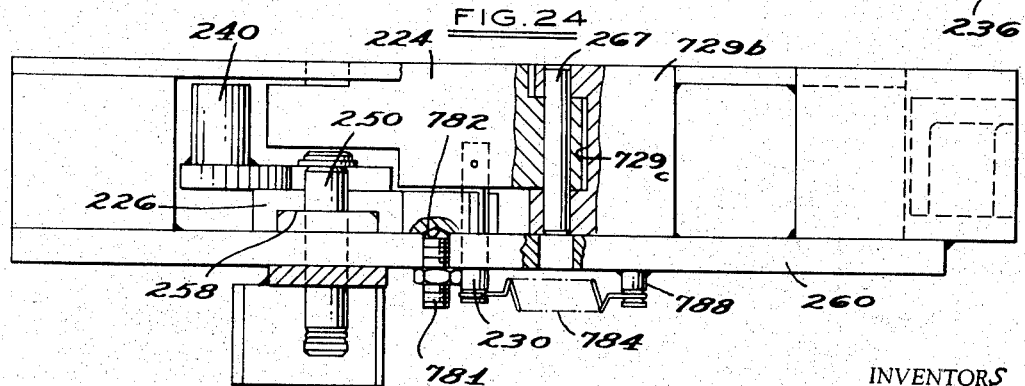

Jan. 2, 1968 J. N. LAUZON ET AL 3,361,247
ARTICLE SORTING SYSTEM AND METHOD
Filed March 28, 1966 18 Sheets-Sheet 15
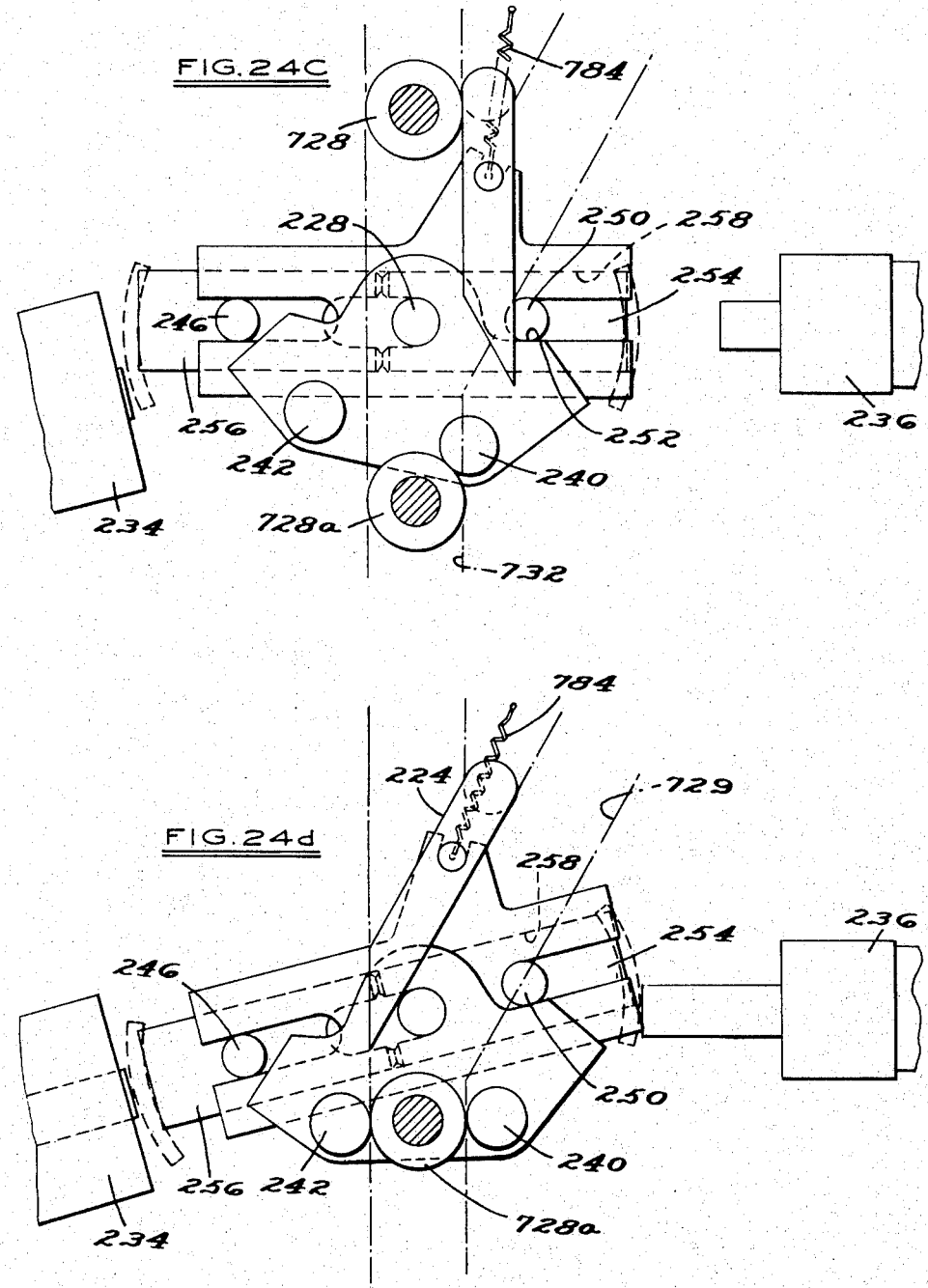
INVENTORS
JAMES NELSON LAUZON
RAYMOND J. SANDNER
JORGEN S. BILDSOE
BY
Burton & Parker
ATTORNEYS

United States Patent Office 3,361,247
Patented Jan. 2, 1968

3,361,247
ARTICLE SORTING SYSTEM AND METHOD
James Nelson Lauzon, East Detroit, Raymond J. Sandner, St. Clair Shores, and Jorgen S. Bildsoe, Royal Oak, Mich., assignors to Taylor & Gaskin, Inc., Detroit, Mich., a corporation of Michigan
Filed Mar. 28, 1966, Ser. No. 538,000
19 Claims. (Cl. 198—38)

ABSTRACT OF THE DISCLOSURE

This disclosure shows an article sorting system in which varying size articles move from an accumulating area through a spacer which spaces them apart a predetermined minimum distance and from which they pass by a keying station and then to a sorting conveyor from which they are selectively diverted at either or both edges of the sorter in accordance with discharge station information fed into the system at the keying station.

---

This invention relates to an article sorting system particularly, though not exclusively, adapted to sorting articles, packages and the like in freight terminals, warehouses, department stores and other locations where the article size and/or shape may vary considerably, and the volume of articles to be sorted is large.

The system comprises an article accumulator section, preferably in the form of an article conveyor on which articles to be sorted accumulate, an article sorter section receiving articles from the accumulator section, an article keying station where the operator may feed destination information into a control system which will cause articles on the sorter section to be discharged therefrom at points along its length corresponding to the destination information, and optionally a recirculating conveyor section for returning unsorted articles from the head end of the sorter section to the accumulator section.

Prior efforts to provide highly efficient sorters adapted to handle large volumes of varied shape and size articles have generally not enjoyed commercial success because there has been either a failure to recognize certain fundamental problems, or if the problems were recognized to provide satisfactory solutions thereto. For example, U.S. Patents 2,666,535 and 2,984,366 disclose two forms of sorting apparatus, each of which is cumbersome and unwieldly in operation as well as high cost. U.S. Patent 2,868,394, while disclosing apparatus overcoming the unwieldiness of the two aforementioned patents, bases its operation on the method taught in Patent No. 2,984,-366 and thereby fails to recognize that the problem of highly efficient selective article discharge cannot be accomplished by following the method taught in such patent because, relating the effective length of the article diverter to the measured length of the article results, we have found, in article interference and diverter and article jamming with the consequent breakdown of the entire system. Also, the means suggested by Patent 2,868,394 for selectively rendering the diverter mechanism operative or inoperative is not suited for either the speed of operation or the abuse encountered in commercial installations, and the design mounting the diverter mechanism on the conveyor slats themselves we have found to be unsatisfactory.

Therefore the primary object of the present invention is to provide an article sorter which overcomes the shortcomings of the prior art and is of reasonable cost and commercially satisfactory design. A concomitant object is the provision of a sorter which is of greater article handling capacity than the prior art sorters and is of foolproof operation.

We have found it is necessary to positively space apart the articles to be diverted before they enter upon the sorting conveyor, with the spacing being a function of article width and angle of departure of the articles as they are diverted from the sorting conveyor. In addition, we have found that satisfactory control of article diversion and avoidance of jamming by successive articles and between articles being diverted and inactive diverters requires close control of diverter movement transversely of the sorting conveyor with the control being related, not to article length as suggested by Patents 2,868,394 and 2,984,366, but rather being related to the distances between leading edges of successive articles.

Therefore another object of the invention is the provision of an article sorter which comprises a spacing conveyor section for spacing apart at least a predetermined minimum distance the articles to be sorted, in combination with a sorting conveyor for discharging articles therefrom at preselected points therealong. The spacing section is herein disclosed as having a spacing conveyor operable under direction of control mechanism associated therewith for causing said predetermined minimum spacing apart of articles moving toward the sorting conveyor, which spacing is a function of the maximum width article to be handled by the sorting conveyor and the angle of departure of the articles from the sorting conveyor.

Another object of the invention is the provision of an article spacing unit per se adapted to receive articles at its tail end and in conjunction with a conveyor to which it delivers articles from its head end space the articles apart, the spacer conveyor including a pair of conveyor sections driven at relatively different speeds with one section adapted to first receive the articles to be spaced and pass them on to a second conveyor operating at a greater speed with the difference in speeds giving rise to a spacing between, the articles, and with a control system associated with the conveyor sections to insure proper spacing between articles and adapted to start and stop the first conveyor section in accordance with whether the articles are being properly spaced.

Another object of the invention is the provision of an article sorting conveyor which will divert articles from both sides thereof whereby discharge stations may be arranged along opposite sides of the sorting conveyor to deliver diverted articles in opposite directions away from the sorter.

Another object of the invention is the provision of a novel method of mounting the diverting mechanism on the sorting conveyor so that such mechanism is substantially functionally independent of conveyor slat damage.

Another object of the invention is the provision of a novel switch for selectively actuating the diverting mechanism, as well as a novel cross-over switch for allowing the diverting mechanism to divert articles at discharge stations arranged substantially opposite one another at opposite sides of the sorting conveyor.

Another object of the invention is the provision of an escort control system in which the information as to discharge station and the effective length of the diverter with respect to each article is encoded on the sorting thru-rods with readers arranged along the length of the sorting conveyor to detect the encoded information from the thru-rods to cause actuation of the diverters at the proper discharge stations. A concomitant object is the provision of a mounting means for the readers as well as for the writers, which place the encoded information on the thru-rods, such that reliable transmission of information to and from the thru-rods may be insured.

A further object of the invention is the provision of safety control means to detect malfunctioning of the sorting conveyor, such as for example the breakage of diverter cam followers or improper location of diverters.

Other objects, advantages and meritorious features will more fully appear from the following specification, claims, and accompanying drawings, wherein:

FIG. 1 (sheet 1) is a plan view of an article distribution system including our sorting conveyor;

FIGS. 2, 3, 4, 5, 6 and 7 (sheets 2 and 3) are plan views schematically showing diversions of various articles and illustrative of certain of the concepts herein disclosed;

FIGS. 8 and 9 (sheet 4 are respectively plan and side views of the article spacer system for positively spacing articles prior to entry upon the sorting span;

FIG. 10 (sheet 5) is a side view showing the junction of the keying conveyor with the tail end of the sorting span;

FIG. 11 (sheet 6) is a plan view of the sorting conveyor taken just below the article supporting upper span and showing return cam rails, code readers, erasers, and other mechanism;

FIG. 12 (sheet 7) is a plan view partially in section of the conveyor slats showing the mounting of the diverter boots;

FIG. 13 (sheet 7) is a fragmentary side view of the slats taken along the line 13—13 of FIG. 12;

FIG. 14 (sheet 6) is a cross-sectional view taken on the line 14—14 of FIG. 12;

FIG. 15 (sheet 6) is a cross-sectional view through a diverter boot and thru-rod taken on the line 15—15 of FIG. 12;

FIG. 16 (sheet 8) is an elevation of one of the boots looking in the direction of arrow 16 in FIG. 12;

FIG. 17 (sheet 9) is a plan view of the boot-diverting cam rails with some slats omitted for clarity and showing a cross-over switch, the view being taken at, for example, discharge stations C and D in FIG. 1;

FIG. 18 (sheet 10) is a plan view of the cross-over switch shown in FIG. 17;

FIG. 19 (sheet 10) is a cross-sectional view taken substantially on the line 19—19 of FIG. 18;

FIG. 20 (sheet 1) is a plan view of one of the diverter switches shown in FIG. 17;

FIG. 21 (sheet 11) is a cross-sectional view taken on the line 21—21 of FIG. 20;

FIG. 23 (sheet 13) is a cross-sectional view taken on the line 23—23 of FIG. 22;

Figure 22:
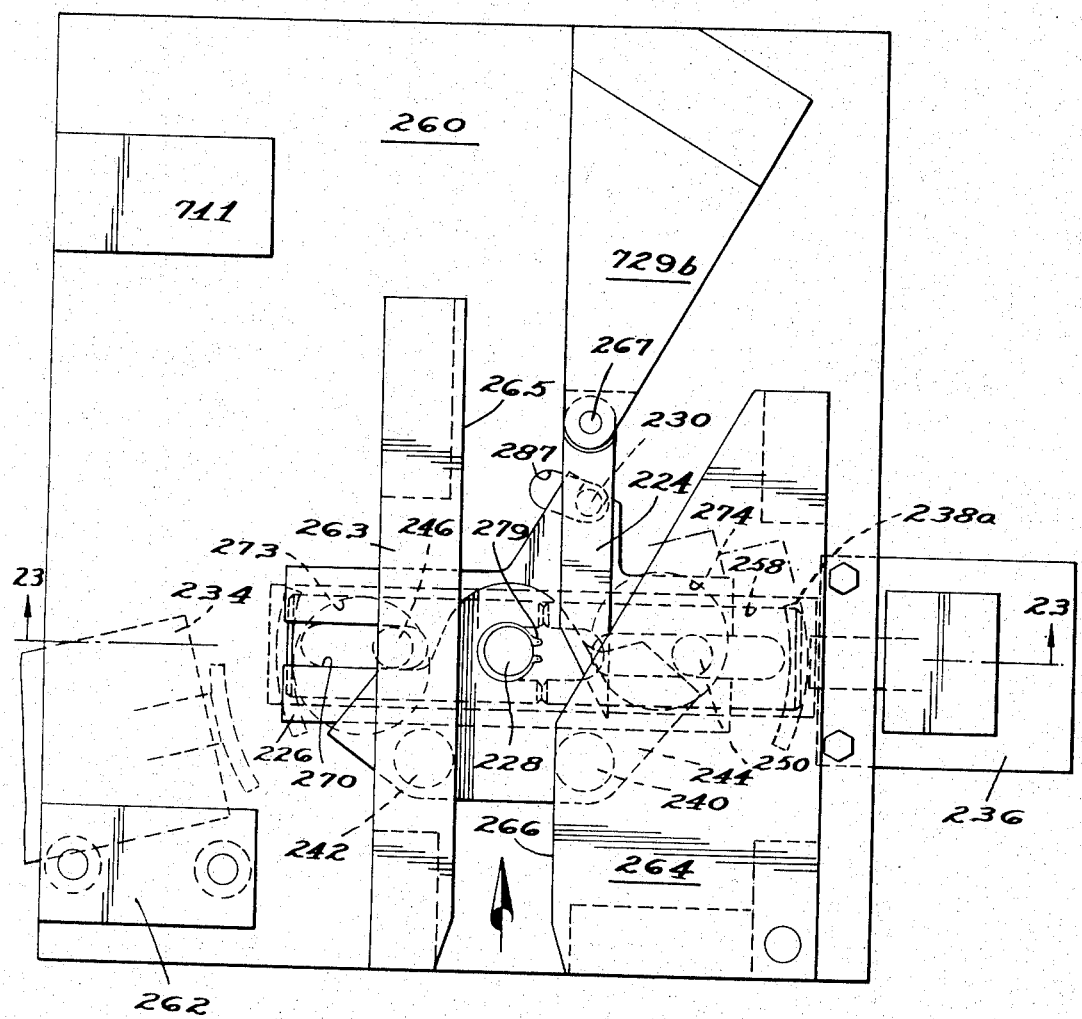
FIG. 22 (sheet 12) is a plan view of a modified form of diverter switch.
Figure 24A:
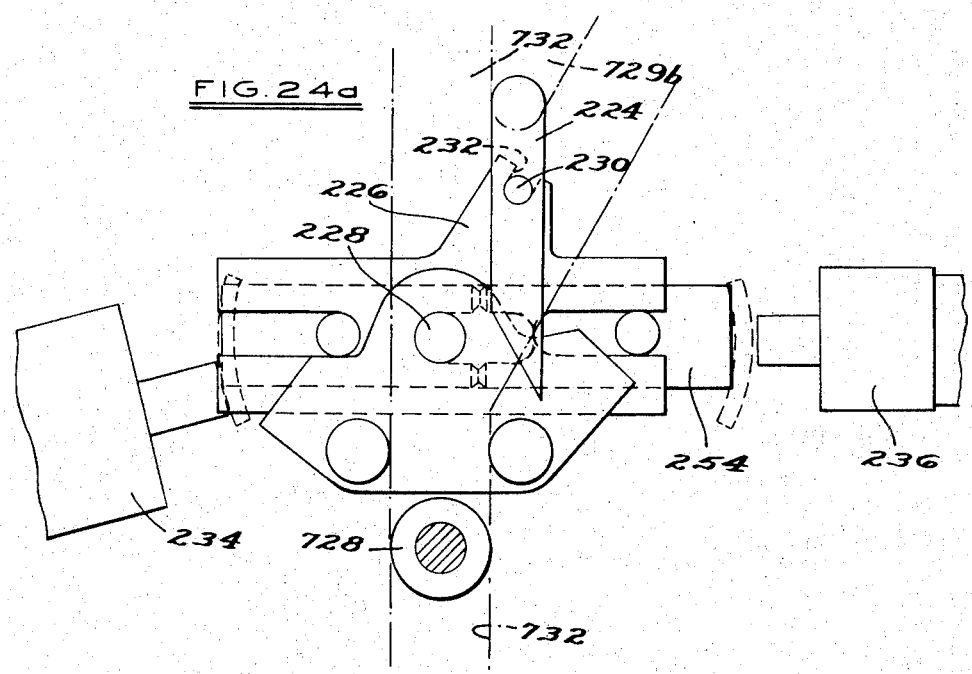
Figure 24B:
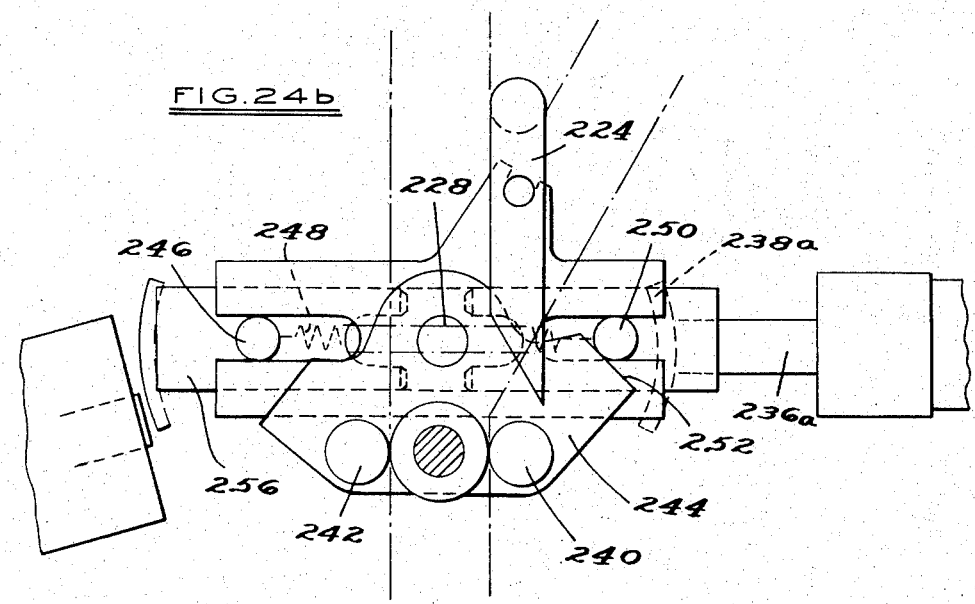
Figure 27:
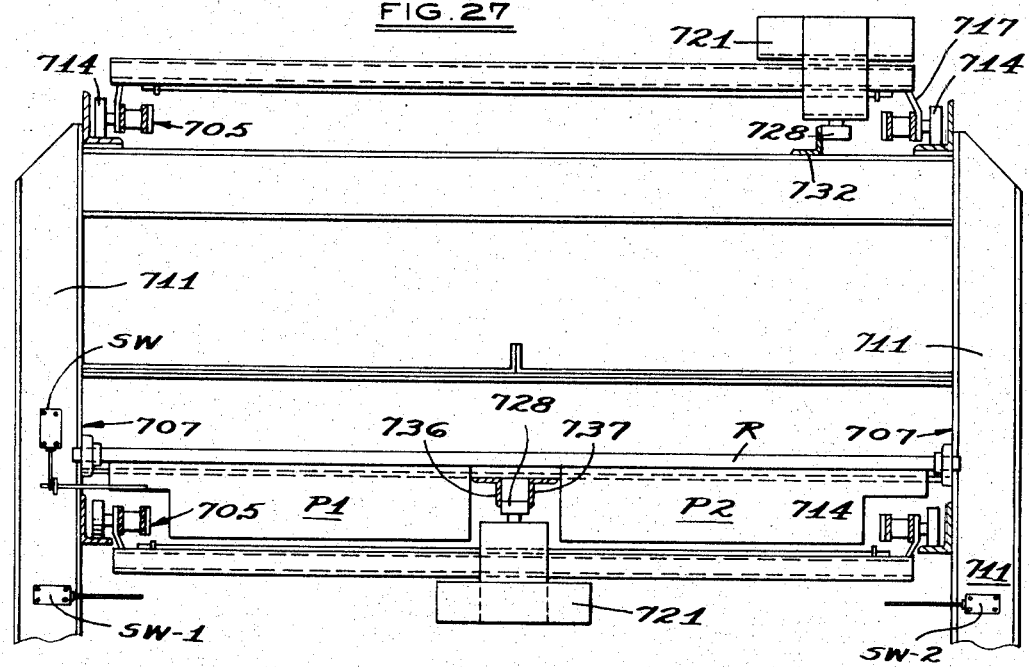
Figure 28:
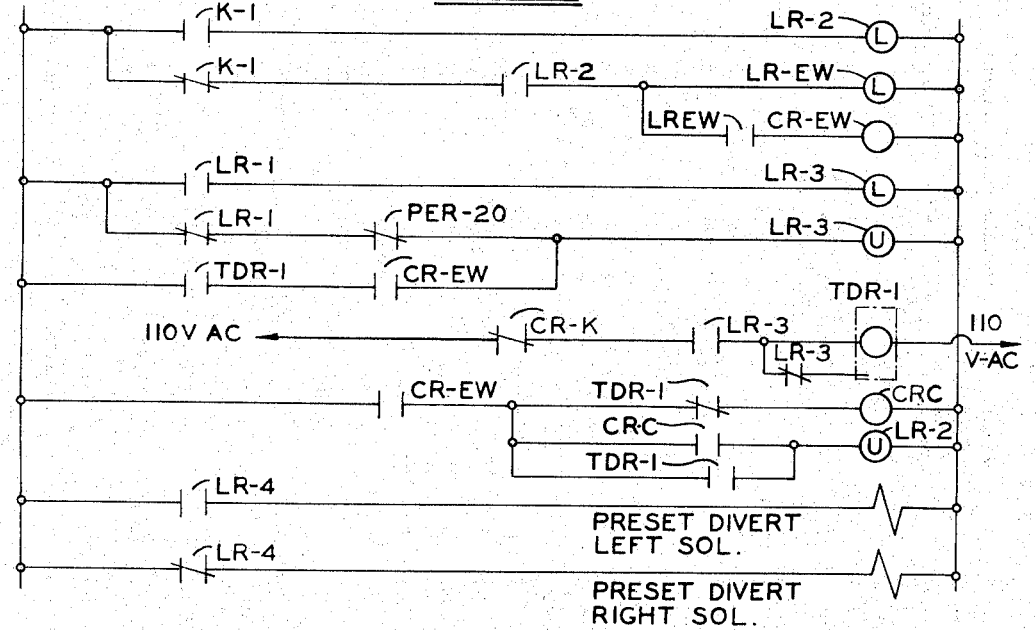
Figure 29:
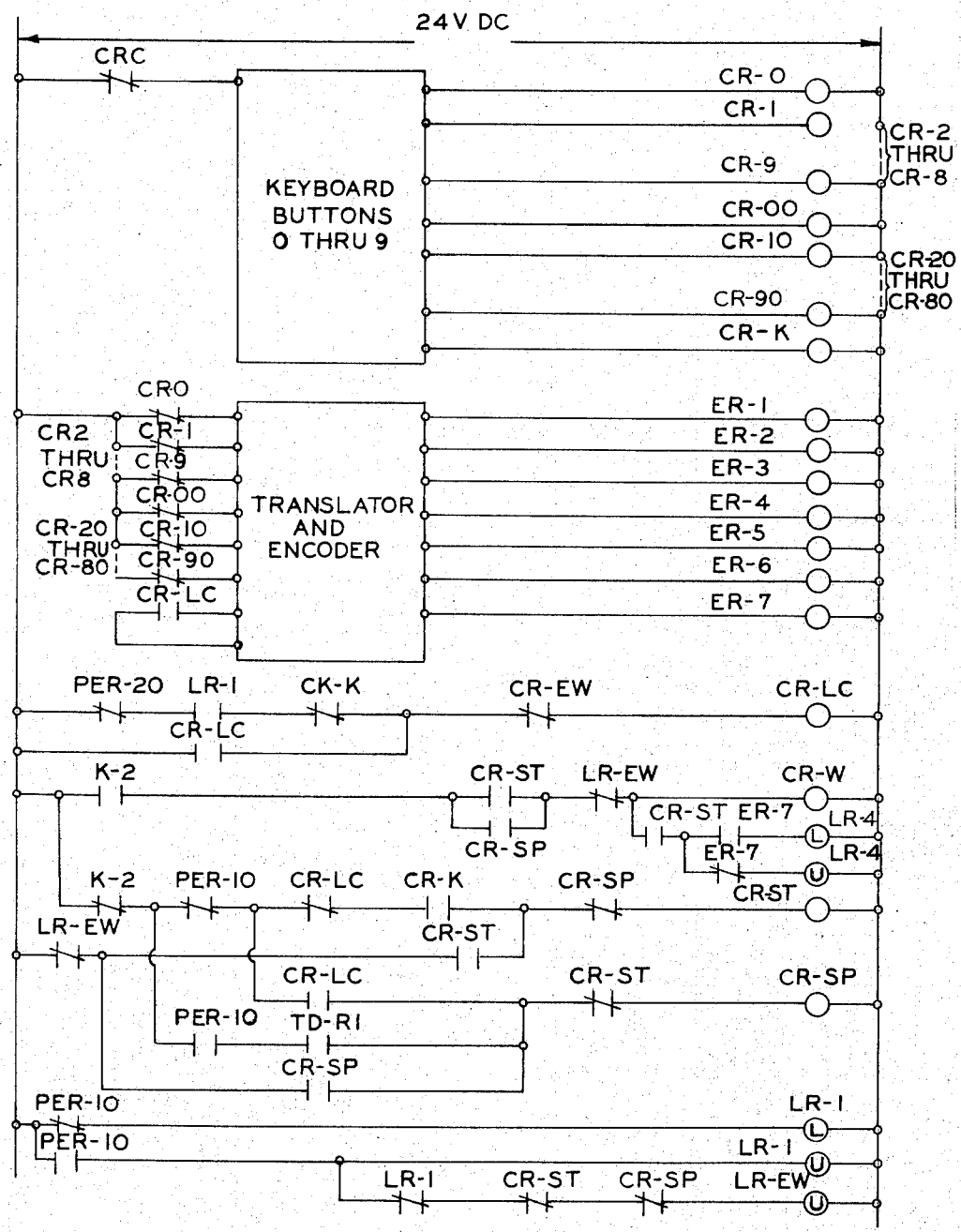
Figure 30:
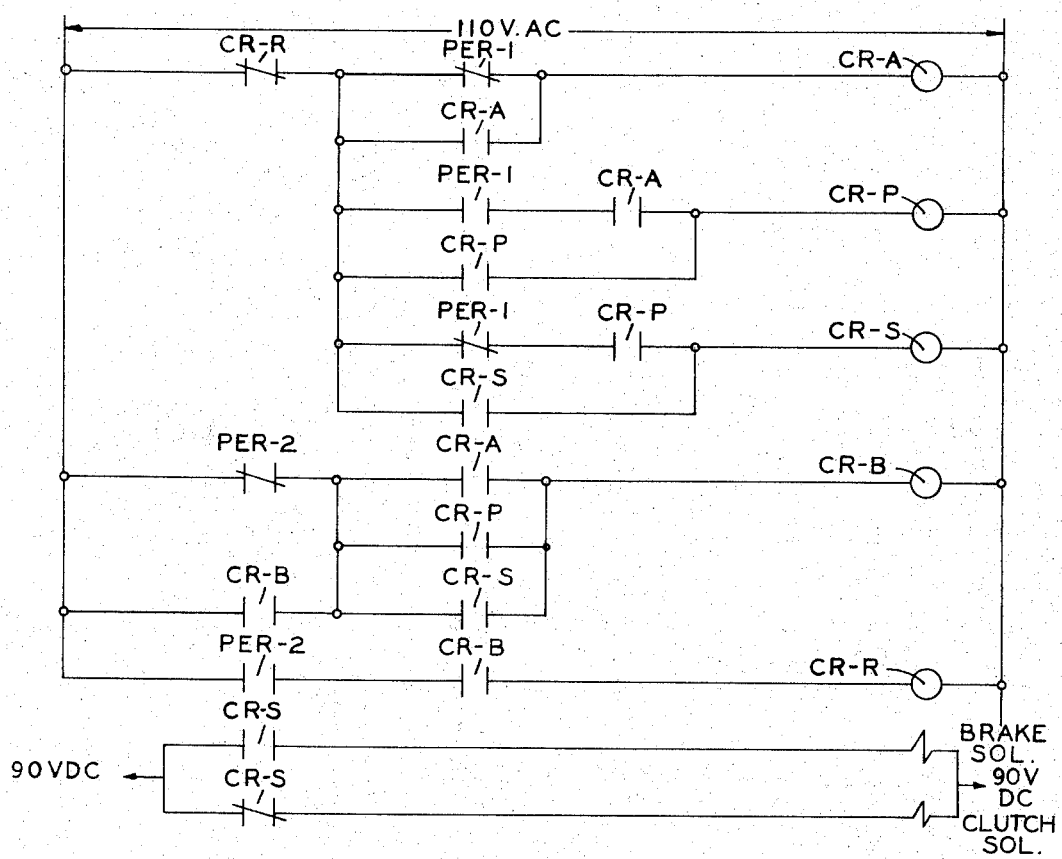

FIG. 24 (sheet 13) is a cross-sectional view taken on the line 24—24 of FIG. 22 but with the switch point in the position shown in FIG. 24d (sheet 15);

FIGS. 24a, 24b, 24c and 24d (sheets 14 and 15) are schematic plan views of the diverter switch of FIGS. 22, 23 and 24 showing the operation of the switch;

FIG. 25 (sheet 8) is a cross-sectional view through the sorting conveyor showing an exemplary reader and code eraser of the control system;

FIG. 26 (sheet 10) is a cross-sectional view through the reader of FIG. 25 taken on the line 26—26 of FIG. 25;

FIG. 27 (sheet 16) is a cross-sectional view through the sorter showing safety switches for detecting malfunctioning of the sorter;

FIG. 28 (sheet 16) is a schematic wiring diagram of the control system for the sorter;

FIG. 29 (sheet 17) is a continuation of the control shown in FIG. 28;

FIG. 30 (sheet 18) is a schematic wiring diagram of the control system for the spacer; and FIG. 31 (sheet 13) is a schematic wiring diagram of a reader-to-divert-switch circuit.

Sorting system

Figure 1:
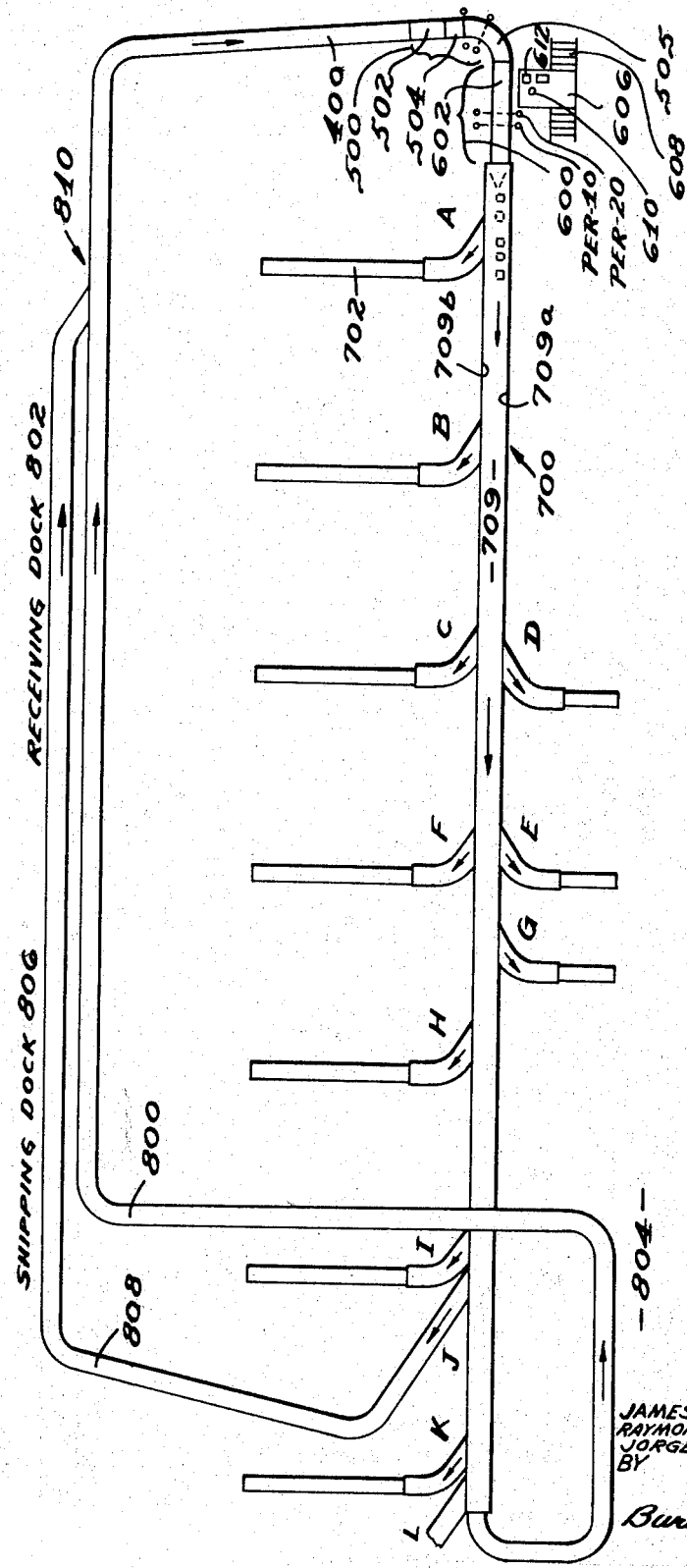

As herein disclosed the complete sorting system broadly includes three sections shown in FIG. 1:

(1) an article accumulating conveyor 400, (2) an article sorter comprising an article spacer 500, a keying station 600 and associated control system, and a sorting conveyor 700, and (3) a recirculating conveyor 800 which returns unsorted articles to the accumulating conveyor. Articles move in the directions of the arrows. They may enter the system at a receiving dock such as 802 along which runs conveyor 808 from sorter discharge station J to junction 810 with the recirculating conveyor. If desired articles may also be entered at any convenient point along the recirculating conveyor 800, as at 804. A shipping dock 806 may be provided along conveyor 808. Articles diverted from the sorter at station J pass directly to the shipping dock 806. Recirculating conveyor 800 may pass either above or below the sorting conveyor.

The article accumulating conveyor 400 receives all articles to be sorted and delivers them to the spacer 500 where they are spaced apart at least a predetermined minimum distance. From the spacer the articles pass through the keying station 600 to the sorting conveyor 700 from which they are selectively diverted at the discharge stations A through L in accordance with station discharge information fed, at the keying station, into a control system associated with the sorting conveyor. Each of the discharge stations may have a short conveyor such as 702 from which the articles may be manually removed for further handling, or there may be a longer conveyor such as 808 which conveys the articles some distance to a removal point.

The system is ideally suited to use in freight terminals or the like, where packages are fed into the system and must be sorted according to intended destination, and a system similar to the one herein disclosed has been installed and is in successful operation in a large freight terminal. It will be understood that the recirculating loop 800 may be omitted if desired, a greater or lesser number of discharge stations provided, and various other modifications made to suit the particular requirements of an intended installation. The recirculating conveyor may be of any suitable type such as a powered roller or belt conveyor, or a combination thereof.

Accumulation conveyor

Articles entering the system, as for example at the receiving dock 802, flow through the conveyor junction 810 and enter upon the article accumulating conveyor 400 which may be in the form of a conventional motor-driven roller conveyor. On the accumulation conveyor, either by suitable automatic devices or human labor, articles are arranged in end-to-end relation, and in the case of freight the address may at this time be read and a destination code mark written on each package for subsequent reading and keying into the sorting conveyor control system when the package passes through the keying station. If destination information is not at this time marked on each package, the packages are at least arranged so that the address is visible for subsequent reading either by a special marker, or by the personnel at the keying station. Suitable start-stop switches (not shown) may be provided for controlling either automatically or manually package flow on the accumulation conveyor to prevent too great a press of articles toward the sorter.

Article sorter

As mentioned heretofore the article sorter comprises:

(1) a spacer,
(2) a keying station, and
(3) a sorting conveyor.

For convenience each is discussed separately below. We have found that these three components are necessary for commercially satisfactory article sorting.

Spacer

The spacer 500 shown in FIGS. 1, 8 and 9, while necessary to satisfactory operation of the sorter may have utility in any conveyor system where it is desired to space apart or insure at least a determined minimum distance between successive articles traveling in either end abutting or randomly spaced relation. The spacer has been designed to be inserted as a unit between the head end of the accumulating conveyor and the tail end of the keying station conveyor 602 and will serve to take articles from the head end of the one and space them, or insure their spacing, at least a predetermined minimum distance apart as they pass onto the tail end of the subsequent conveyor. To carry out the spacing function three conveyor belts are required, two of them comprising what may be termed the spacer conveyor and the third, though essential to the spacing operation, may be a conveyor belt having some function in addition to package spacing; for example, it may be the belt which carries packages through the keying station, or in the case of a sorter which diverts packages from only one side, it could be the sorting conveyor itself.

The spacer conveyor includes belts 502 and 504, the latter running faster than the former to open a "peak-a-boo" interval between packages moving from belt 502 to belt 504. The packages move with the "peak-a-boo" interval between them successively to the belt 505 which is a continuously operating belt. Considering FIGS. 8 and 9, as package Pa moves from belt 502 to belt 504 it is accelerated opening a gap between it and succeeding package Pb through which a light beam from lamp 506 may impinge upon electric eye PER 1. Package Pa is then carried on by the conveyor belt 505 to interrupt and pass through the light beam from lamp 508 impinging upon electric eye PER 2. The distance between these light beams determines package spacing effected by the spacer. If package Pa has not cleared the beam from lamp 508 before package Pb interrupts the beam from lamp 506, the belts 502 and 504 are immediately stopped automatically until Pa has cleared the beam from 508 and then the belts are restarted. The belts 502 and 504 are driven by a chain drive 510 and 512 entrained at one end over sprockets 513 of a motor-driven clutch and brake unit schematically shown at 514, and entrained at the opposite end over sprockets 518 and 520 connected to belt drive rolls 522 and 524. We have found that if belt 502 is operated at 110 feet per minute, and belt 504 at 150 feet per minute that very satisfactory spacing operations result. The sprockets are sized to provide the aforementioned belt speed differential. The motor driven brake and clutch unit 514 is of conventional construction and need not be described except to explain that it includes an electric motor operating sprockets 513 through an electric clutch with a brake provided to stop the sprockets when the clutch is disengaged. The brake is provided with a solenoid control switch for applying and releasing it, as is the clutch. The belts, and associated mechanism, are supported on a suitable framework 526.

The control system for the spacer is schematically shown in FIG. 30 and operates in the following fashion, it being understood that relay contacts and switches are shown in their normally open or normally closed positions which is their condition when a light beam is being interrupted. As a package interrupts the beam to PER 1, relay CR–A is energized. When the package leaves PER 1, CR–P is energized. This first package is now between light beams impinging upon PER 1 and PER 2. When a second package interrupts the beam impinging on PER 1, this causes an energization of CR–S. When relay CR–S is energized it causes the application of the brake and the release of the clutch. This stops belts 502 and 504 with the result that packages on the spacer conveyor are interrupted in movement. When the first package interrupts the light beam impinging on PER 2, the relay CR–B is energized. As the first package clears the beam, PER 2 energizes CR–R which in turn de-energizes relays CR–A, CR–P and CR–S. Relay CR–S causes a release of the brake and application of the clutch to start the belts 502 and 504 moving with the result that the second package follows the first with a gap therebetween determined by the distance between the beams. In the sorting system disclosed in this application a gap of substantially 23 inches between packages has been found necessary. When relays CR–A, CR–P and CR–S are de-energized, relay CR–B is also de-energized which in turn de-energizes relay CR–R. The cycle is now ready to repeat. Of course if the packages are spaced farther apart than 23 inches as they enter upon the belt 505, the spacer belts 502 and 504 will not stop as will be evident from a study of FIG. 30.

For maximum efficiency of operation conveyor 400 should be operated at substantially the same speed as belt 502, and conveyor 505 should be operated at substantially the speed of belt 504, though obviously the speeds of the conveyors between which the spacer conveyor is disposed may run at speeds which are somewhat different from those of the spacer belts.

In the drawings, as particularly shown in FIG. 8, conveyor belt 505 is separate from belt 602 which runs through the keying station. Such would not be necessary if it were not for the necessity of directing the articles around a right angle turn in the system shown in FIG. 1. In other words, conveyor 505 could, if conditions of installation permitted, run on through the keying station. Conveyor belt 505 is of conventional construction. It is driven by any suitable drive mechanism.

From the foregoing description it will be apparent that the spacer will lend itself to use in any conveyor installation where it is necessary to space apart a succession of articles at least a certain minimum distance. It is merely necessary to insert the spacer conveyor between the head and tail ends of a pair of conveyors, and for maximum efficiency of operation have each such conveyor run at the speed of that spacer conveyor belt with which it is contiguous.

After being spaced apart the articles pass through the keying station. A description of the keying station will follow the explanation of construction and general operation of the sorting conveyor.

Sorting conveyor

The sorting conveyor 700 extends from the head of conveyor 602 to the downstream side of discharge station L as shown in FIG. 1. The discharge stations are arranged along opposite sides of the sorting conveyor and articles are diverted selectively thereto in accordance with destination information fed into the control system at the keying station 600. The conveyor is of the slat type having an endless succession of slats 704 (see FIG. 17) supported at opposite ends upon roller chains 705 and 706 riding on a supporting framework 707. The roller chains are entrained over sprockets 708 at the tail end of the conveyor and similar sprockets, not shown, at the head end of the conveyor. One set of sprockets or the other, preferably those at the head end, is driven by a suitable drive motor, not shown. The conveyor has an article supporting run 709 and a return run 710 therebeneath. Disposed between the runs is the mechanism for effecting package diverting action.

In general, package diverting action is accomplished by mechanism associated with and forming a portion of the sorting conveyor, such mechanism being of variable effective length and operating to sweep packages at preselected discharge stations laterally off the slat conveyor to the intended discharge station. The effective length of the diverting mechanism is a function of the distance between the leading edges of successive articles entering upon the sorting conveyor. The diverting mechanism comprises a succession of boots, each supported in associated with a slat to move transversely of the slat conveyor along its associated slat, and the number of such boots so traversed determines the effective length of the diverter for each package. Examples are shown in FIGS. 2 through 7 where varying numbers of boots, which may conveniently be referred to as strings of boots, are being caused to traverse in order to accommodate different package moving on the conveyor to cause diversion or discharge of the packages at selected discharge stations. A further explanation of such figures of the drawings will hereinafter appear, it being sufficient to note for the moment that to divert a package to a discharge station arranged adjacent edge 709a, such as station D, as in FIGS. 5, 6 and 7, the boots to effect such diversion must be prepositioned along the remote edge, i.e., edge 709b, while packages to be diverted to stations arranged along edge 709b, must first be prepositioned along the remote edge 709a. Such prepositioning occurs before the boots reach the supporting run of the conveyor, in a fashion hereinafter explained.

The framework 707 for the sorting conveyor includes a plurality of uprights 711 arranged in spaced relation along the length of the conveyor and between which extend cross pieces 712, see FIGS. 10, 16 and 25. Secured to the uprights and cross pieces are the roller-supporting rails 713 for carrying the rollers 714 on the article supporting run, and the rails 715 for supporting the rollers on the return run. There is a roller for each chain pin 716. Welded or otherwise suitably secured to the successive links of the chains, intermediate the link pins, are slat-supporting brackets 717 and 717a, the former being offset as shown in FIG. 16 for securement to inside links of the chain, and the latter for securement to outside links of the chain. The upper ends of the brackets are secured to angle brackets 718 which are in turn secured in any suitable fashion to the underside of the slats.

The slats are in the form of channels generally C-shaped in cross section as shown in FIG. 13. Disposed adjacent the open side of each channel and extending parallel to the slat is a thru-rod 719 which is carried by angle brackets 720 at opposite ends secured to the rod and to the underside of the slat (see FIGS. 14 and 15). Mounted on each thru-rod to move with the conveyor and at the same time along the length of the slat for lateral traverse of the conveyor, is article diverting means in the form of a diverter boot having a trapezoidally-shaped article engaging head 721 supported by a thin neck portion 722 extending downwardly between adjacent slats and secured to a body member 723 which is slidably mounted on the thru-rod. A stabilizing arm 724 having a roller 725 received in the channel-like side 726 of the slat may comprise an extension of the neck part 722. The boot head 721 may be plate-like in form as shown in FIG. 15, or may have greater vertical dimension as by being a box-like structure of trapezoidal shape in plan view, the walls of which may project upwardly as high as the upper end of the neck. The boot head is preferably removably secured as by bolts 727 to the neck for ready replacement in the event of damage.

Each diverter boot is provided with means for engaging guide and cam tracks disposed adjacent the thru-rods to guide and cause lateral traverse movement of the boots during operation of the conveyor. Such means comprises a depending cam follower or actuator in the form of a guide roller 728 which is adapted to cooperate with diagonally extending camming or guide tracks at the various discharge stations. For example, in FIG. 17, two such cam tracks are shown, track 729 for diverting boots at discharge station C, and track 730 for station D. It will be noted that these cam tracks cross one another because the discharge stations C and D are substantially opposite each other. A cross-over switch 731, described hereinafter, serves to allow the cam follower rollers 728 to pass through the intersection of the cam tracks.

In addition to the diagonal cam tracks associated with each discharge station, there are diverter boot guide tracks 732 and 733 which extend along adjacent opposite edges of the article supporting run of the conveyor from the head to the tail thereof and which communicate with the cam tracks by diverter switches, such as the switches 734 and 735 of FIG. 17. There are also guide tracks 736, 737, 736a and 737a which extend along the return run of the conveyor just above the thru-rods as shown in FIGS. 11 and 25 (sheets 6 and 8). Such guide tracks 736 and 737 pick up the cam rollers 728 as they move along the return run toward the tail end of the conveyor, and representative cam rollers are shown in FIG. 11 engaged with such tracks. It will be noted that the boots are guided to the center of the return run and approach a prepositioning switch 738 which switches the cam rollers either to track 736a or 737a. Because in the layout of FIG. 1 there are more discharge stations along side 709b of the conveyor than side 709a the prepositioning switch and tracks 736a and 737a are so arranged and aligned with the tracks 736 and 737 that the cam rollers may normally pass straight through the switch to ride track 736a, see FIG. 11, which guides the boots to edge 709a of the conveyor on the article supporting run which is opposite, or remote from the greater number of discharge stations, because there will be more boots prepositioned at edge 709a than edge 709b. To guide the cam rollers during their traverse around the tail end of the conveyor, a pair of circular guide plates 740 are mounted on the shaft of sprockets 708, the plates being aligned with the guide tracks 732 and 733 of the supporting run and the ends of tracks 736a and 737a of the return run to guide the cam rollers therebetween.

To keep the supporting and return runs of the conveyor on the supporting tracks, centering rollers 738, each carried by a suitable bracket secured to the ends of selected slats in any convenient fashion as by bolt 738a, ride the upstanding flange 713a and 715a of the supporting rails, as shown in detail in FIGS. 12, 13 and 14. The supporting tracks and guide and cam tracks may, in each instance, be conveniently formed by suitable lengths of angle iron. Various modifications may, of course, be made in the track and framework to suit the particular conditions of the installation.

*Prepositioning and diverter switches*

As hereinbefore mentioned there is a cam roller diverter switch for each of the cam tracks, or in other words, a diverter switch for each discharge station. In FIG. 17, two of such switches are shown: switch 734 to effect article discharge at station C by causing excursion of boot rollers from guide tracks 732 to the cam tracks 729, and diverter switch 735 for causing article discharge at station D by diverting guide rollers from guide tracks 733 to 730. In FIGS. 20 and 21 details of the construction of switch 734 are shown but it will be understood that except for the fact that switch 735 is of the other hand, its construction is similar. The other diverter switches in the sorter may be of this construction, or of a modified construction hereinafter to be described.

As shown in FIGS. 20 and 21 the switch is mounted on a base plate 200 which is secured in any suitable fashion to one of the uprights 711 of the sorter framework. Pivotally mounted on the base plate for swingable movement between the solid and phantom outline positions shown in FIG. 20 is a diverter 202 which forms an extension of the guide track 732 and is disposed within an interrupted portion of the guide track as clearly shown in FIG. 17. The diverter is in the form of an upwardly opening channel through which the boot cam rollers 728 can pass. The diverter may include an elongated plate-like bottom wall member 204 from which upwardly extend side walls 206 and 208 which are secured as by welding to member 204. A pivot pin 209 extends downwardly from the plate 204, being secured thereto as by welding and passes through a bushing 210 received in a suitable aperture in the base plate 200, with a spacer member 211 encircling the bushing and supporting the diverter above the base plate in proper alignment with the guide rails 732. The pin 209 may be threaded for reception of a nut and washer to secure the diverter to the base plate.

The diverter in the solid outline position of FIG. 20 will cause a boot cam roller to continue its course between the spaced ends of the guide tracks 732 within which the diverter is mounted so that the boots will continue along the edge 709a of the supporting run. However, when the diverter is swung to the phantom outline position the cam rollers will be cause to divert to the cam track 729. Such track is provided with a nose portion 729a to assist in guiding the roller from the free end 212 of the diverter to the cam track. The diverter is swung between the solid and phantom outline positions by a toggle link arrangement comprising a link 213, pivoted at its outer end to a bracket 214 secured to the diverter, and pivoted at its inner end to the bellcrank plate 215. Plate 215 is pivotally mounted on the base plate 200 as at 216 and is also pivotally connected as at 217 to the piston rod 218 of a fluid pressure cylinder 219. The other end of the cylinder is pivotally mounted as at 220 to a suitable bracket 221 upstanding from an extension plate 222 secured to the base plate 200. The geometry of the toggle link and the travel of the piston rod is such that with the rod retracted the diverter is in its solid outline position, while with the piston rod extended the diverter is in the phantom outline position, and in such position the toggle mechanism is self-locking in that the diverter will not be forced back to its solid outline position by the action of the cam rollers traveling through it. It will also be noted that when the diverter is in its solid outline position the geometry of the toggle link is such that the diverter will tend to remain in such position with only a very slight fluid pressure in the cylinder urging the piston to its retracted position, and similarly a slight fluid pressure in the cylinder will maintain the diverter in its phantom position because of the above-mentioned self-locking character of the toggle geometry. It will be noted from FIG. 20 that the nose 729a is rounded at its tip and both sides are sloping, and this is to avoid possible catching of a cam roller on the nose.

The cylinder 219 is provided with fluid pressure lines, not shown, which are connected to a source of fluid under pressure. Solenoid operated control valves in such lines control pressurization and exhaust of opposite ends of the cylinder. In FIG. 31 a pair of solenoids are shown which are representative of those which would be connected to the fluid pressure control valves for controlling operation of the cylinder 219. Each is connected in a circuit with a switch or relay controlled by a reader, hereinafter more fully described, and when the reader determines that the divert switch is to be actuated to cause diverting of cam rollers from the guide track to the cam track, the reader causes closure of one pair of contacts to energize the divert solenoid and an opening of the other pair of contacts to de-energize the stop-divert solenoid, thereby causing pressurization of cylinder 219 to effect a swinging of the diverter from the solid outline to the phantom outline position. When the reader detects that diverting of cam rollers is to be discontinued and that they are to continue straight through the divert switch rather than proceeding onto the cam track, the contacts open and close to assume their normal positions shown in FIG. 31 and a consequent de-energization of the divert solenoid and an energization of the stop-divert solenoid causes reverse pressurization of cylinder 219 and a retraction of its piston rod to cause the diverter to swing from the phantom to the solid outline positions.

It will be apparent from what has been said that accurate timing of the movement of the diverter between solid and phantom outline positions is critical to avoid jamming or catching of a cam follower roller on the nose 729a of the cam track. In one installation where the rollers move through the switch at the rate of five rollers per second, tendency of the cam rollers to hang up on the nose led to the design of a modified diverter switch, such being shown in FIGS. 22–24d.

This modified diverter switch utilizes a pair of control solenoids, similar to that heretofore mentioned in connection with FIGS. 20, 21 and 31, except that such solenoids do not control the actuation of fluid pressure control valves, but rather condition the switch for auto-actuation as a cam follower roller passes through it. In other words, when the reader signals that the switch is to divert cam rollers, a solenoid is energized which preconditions the switch such that when a roller passes through it, the switch will automatically cause itself to be thrown at the proper instant and thereby avoid the necessity of accurately timing the signal from the reader in relation to the position of a cam roller relative to the nose 729a which was necessary with the switch shown in FIGS. 20 and 21.

Exact timing in the auto-actuation of this improved diverter switch is insured by the fact that a cam roller 728 in passing through the switch mechanically shifts the diverter element, and such shifting occurs while the cam roller is at a predetermined position in the switch. Further, the speed with which the diverter is shifted is a function of the speed with which the roller moves through the switch and the construction of the switch is so arranged that once the signal has been given it to cause diversion, it would be impossible for a cam roller passing through it to catch or otherwise be fouled in the switch. For example, and referring to FIGS. 24a through 24d, which schematically illustrate operation of this switch, a cam roller is shown at 728 moving in the direction of the arrow and entering the switch while in its normal position for straight-through passage of the roller. The portion of the switch corresponding to the nose 729a of the cam track is indicated at 729b and the guide track 732 is schematically shown. The switch is provided with a swingable switch point or diverter element 224 which is pivotally mounted on the nose 927b to swing from the position shown in FIG. 24a to the position shown in FIG. 24d. When the switch point is in the position shown in FIG. 24d the rollers will be caused to divert along the cam track indicated in phantom at 729. The point 224 is caused to swing between its two positions by an actuator plate 226 which is mounted for swingable movement upon a pivot pin 228, the plate being connected to the switch point by an actuating pin 230 secured at its upper end to the switch point and received in a notch 232 in an extension of the plate. It will be apparent that upon counterclockwise movement of the plate about the pin 228, the switch point will be thrown from the position of FIG. 24a to that of FIG. 24d.

Swinging of the plate between the aforesaid positions and thereby the movement of the switch point is effected by passage of the roller 728 through the switch itself when the switch has been preconditioned to cause a change of roller direction. The preconditioning is accomplished by either one or the other of two solenoids shown at 234 and 236, the former corresponding to the stop-divert solenoid of FIG. 31, and the latter to the divert solenoid of such figure. When solenoid 236 is energized, as by closure of contact points corresponding to those connected to the divert solenoid of FIG. 31, the solenoid plunger 236a is extended and in turn shifts to the left a yoke member 238 (see FIG. 23) by engaging a depending arm 238a thereof. At the time this energization of the solenoid occurs it will be observed that the roller 728 has moved farther into the switch such that it is disposed between a pair of camming lugs 240 and 242 which upstand from a keying plate 244 also pivotally mounted on the pin 228. Because the roller is between these lugs the plate cannot shift under the influence of the solenoid 236. If the roller were not present, the movement of the yoke to the left under the influence of the plunger 236a would cause tension pin 246 to be shifted to the left and through the medium of spring 248 connected at one end to such pin, and at the other end to tension pin 250, and would draw pin 250 to the left and cause it, through reaction with the angle surface 252 of the keying plate, the swinging of the keying plate in a clockwise direction about the pivot pin 228.

However, because the cam follower roller is between the lugs 240 and 242 the keying plate 244 cannot swing clockwise and therefore energization of solenoid 236 simply serves to shift the yoke to the left thereby urging the tension pin 246 to the left and tensioning the spring 248. Pin 250 remains in the position shown in FIG. 24b until the cam follower roller has moved beyond the lugs 240 and 242, for example, to the position shown in FIG. 24c, when the keying plate can then pivot to the position shown in such figure. In fact, the aforesaid clockwise movement of the keying plate would occur before the roller 728 reaches the position shown in FIG. 24c, but the condition of the switch in relationship to the boot rollers is shown in FIG. 24c to illustrate the next step in the operation of the switch.

It will be observed in FIG. 24c that a following roller 728a is now entering the switch and engages the lug 240. It will also be observed that by virtue of the swinging movement of the keying plate to the position shown in FIG. 24c, the tension pin 250 has moved to the left and now abuts the locking shoulder 252 of the keying plate. The tension pins 246 and 250 are mounted in a pair of slides 254 and 256 which are supported on the actuating plate in a guideway formed in the underside of the actuating plate 226, such guideway being indicated in phantom at 258. It will be noted in FIG. 24b that under the influence of the leftward movement of the yoke, the slide 256 has been shifted to the left while the slide 254 has only shifted until its tension pin 250 abuts the sloping surface 252 of the keying plate 244.

With the parts in the relationship shown in FIG. 24c, and with the tension pin 250 locked against the surface 252 of the keying plate, when the roller 728a abuts the lug 240 and continues to pass into the switch, it reacts against the lug to cause the keying plate to swing about the pin 228 in a counterclockwise direction and through the reaction of tension pin 250 against the surface 252, and in turn through the slide 254 within the guideway 258 of the actuating plate 226, the actuating plate is caused to rotate upon the pin 228 in a counterclockwise direction and cause the switch point to swing from the position shown in FIG. 24c to that of FIG. 24d. It will be observed from a study of FIGS. 24c and 24d that by the time the cam follower roller has reached the position aligned with the lugs 240 and 242, the switch point has already shifted and is prepared to divert the roller 728a to the cam track 729. It will also be observed that it would be impossible for the roller 728a to pass beyond the position shown in FIG. 24d without causing the switch point to be shifted to the roller diverting position shown in FIG. 24d.

It will of course be apparent that should the solenoid 236 be energized at just the instant that would allow the yoke to cause leftward movement of the tension pins, i.e., when a cam follower roller was not between the lugs 240 and 242, the keying plate would be shifted under the influence of the pin 250 such that when the next roller, similar to roller 728a engaged the lug 240 it would cause the switch point to be thrown. The description outlined for FIGS. 24a through 24d illustrates the action of the switch when there is a roller in a position in the switch or just entering the switch which causes the switch to delay the automatic throwing of the switch point until a roller is in a proper position to cause the auto-actuation of the switch.

FIG. 22 shows a plan view of details of the diverter switch whose operation has been described above. The switch is shown as a right-hand diverter switch and would be used, for example, in lieu of switch 734 of FIG. 17. Left-hand switches would be of a similar construction with parts reversed. The switch includes a base plate 260 which is supported in any convenient fashion on the framework 711 of the sorting conveyor. Supplemental support brackets which may be connected to the framework of the sorter in any convenient fashion are indicated somewhat schematically at 262. Supported above the base plate are glide members 263 and 264 whose opposed sides 265 and 266 define a cam roller guideway forming an extension of the guide tracks 732. Also mounted on the base plate is the cam track nose 729b. As shown in FIG. 24, nose 729b is provided with a recess 729c within which the switch point or diverter 224 is pivotally mounted on the pin 267. Swingably overlying the base plate 260 is the actuating plate 226 supported on the pivot pin 228. The actuating plate is provided with a pair of aligned spaced apart tension pin receiving slots 270 and 272. The tension pins project through circular openings 273 and 274 in the base plate, with each pin being carried by its own slide 256 and 254 received within a channel 258 in the underside of the actuating plate 226 shown in FIG. 24.

The tension pins, as shown in FIG. 23, project through slots 275 and 276 in the yoke 238 and spring 248 tensions the pins against the inner ends of such slots as shown in FIG. 23. The yoke 238 is provided with a third slot 277 through which the pivot pin 228 extends and upon which the yoke pivots. A washer 278 overlies the yoke at the slot 277, and another washer at the opposite end of the pin together with suitable snap rings such as the ring 279 at opposite ends of the pin, serve to maintain the pin and the various parts of the switch which pivot about it in proper relation on the base plate. A detent may be provided for preventing vibration from tending to shift the switch point. Such detent may comprise a threaded element 781 threaded into the base plate 260, as shown in FIG. 24 and having a ball end received in a suitably provided recess 782 and the underside of the plate 226. The detent screw is so located in the plate 260 that it will engage the switch point 224 when the same is in the position shown in FIG. 22. In addition, an over-center tension spring is provided as schematically shown in FIGS. 24c and 24d at 784 and in FIG. 24. The spring is connected as shown in FIG. 24 at one end to the pin 230 which connects the switch point to the actuating plate (the pin extending through a suitably provided slot 287 in the base plate) and with the opposite end of the spring being connected to a lug 788 secured to the bottom of the base plate. It will be observed from FIGS. 24c and 24d that the action of the spring 784 is to hold the switch point in either of its thrown positions.

Return movement of the switch point from the position shown in FIG. 24d to that of FIG. 24a is in like fashion to that heretofore described, and the reverse movement will be apparent from a study of the drawings. In either direction that the switch point is thrown its movement is caused by the passage of the cam follower roller through the switch just prior to such roller reaching the switch point. This switch it will be understood is suitable for use as the prepositioning switch 739 of FIG. 11.

An example of a cross-over switch, such as the switch 731 shown in FIG. 17, is detailed in FIGS. 18 and 19. The switch is mounted on and includes a suitable base plate 789 which is secured in any suitable fashion to the sorting conveyor framework. The cam guide tracks 729 and 730 are arranged as shown with respect to the base plate 789 and are secured thereto in any suitable fashion. A cam roller 728 is shown moving along the cam track 730 in the direction of the arrow and when it reaches the actuating element 790, which is rigidly mounted on a toggle link 791 pivoted on the plate at 792, it causes the actuating element to be shifted ahead of the roller to a position allowing the roller to continue its travel along the cam guide track 730. The link 791 is provided with a downwardly extending pin 793 which is received within a slot 794 formed in the end of a link 795 pivotally supported on a pin 796 upstanding from the base plate. The opposite end of link 795 is provided with a slot which engages a pin 797 depending from a switch point 798 pivotally mounted as at 799 on cam track nose element 799a. The base plate 789 is provided with an opening 789a and a bridge 796a thereacross upon which the pin 796 is mounted. The opening provides clearance for the movement of the link or pivot arm 795. A suitable deflector 787 is secured to the base plate 789 to deflect cam rollers 728 into the cross-over switch. Therefore, when the actuator element 790 reacts to the movement of the cam rollers 728 to be swung ahead of it, such movement of the element causes swinging of the arm or link 795 in a clockwise direction causing swinging of the switch point 798 from the solid to the phantom outline position of FIG. 18. As a consequence, when the cam roller 728 reaches the interruption of cam track 730 at the crossover, the roller will ride the switch point to the nose 799a and thence continue its travel along the remainder of the cam track 730. When a cam roller moves down the cam rail 729 and engages the actuating element 790, it will similar to the action above described cause the switch point 798 to swing from the phantom to the solid outline position of FIG. 18. It will be observed that this crossover switch is of the auto-actuation type and will not allow a cam roller to pass through it unless the switch point has been shifted to the proper position, and such switch point will be shifted to a position to guide the cam roller without any danger of the roller catching on the end of the switch point while the point is being shifted.

*Keying station and control system*

The keying station 600, shown in FIG. 1, includes the keying conveyor 602 and an operator station 606 adjacent the keying conveyor. The operator station may comprise a raised platform approached by stairways 608, a chair 610 for the operator and an information input keyboard, or keyboards 612. As articles to be sorted pass by station 606 on the keying conveyor, the operator reads the destination, or discharge station information which may have been marked on each package by markers stationed at the accumulating conveyor, and then keys the information into the control system as by pressing buttons or the like in the keyboard 612.

The keying conveyor is a belt conveyor driven in timed relation with the sorting conveyor through an arrangement shown in FIG. 10. It will be observed in FIG. 10 that the sprocket 708 and their supporting shaft are carried by bearings 708a which are mounted on a frame 707a shiftably supported by suitable supporting lugs 707b carried by the stationary framework 707 of the sorter. Upon adjusting nut 707c the frame may be shifted to the right or left to adjust the tension in the sorting conveyor runs 709 and 710. The keying conveyor belt 602 is entrained at opposite ends over rollers, one of which is shown at the head of the keying conveyor. Roller 614 is supported in any suitable fashion on a keying conveyor framework 616 mounted on the movable frame 707a. The belt is driven from a sprocket 617 mounted on the shaft of sprocket 708 to turn therewith. Chain drives 618 and 621 entrained over a sprocket assembly 620 drive a belt drive roller 622 about which the belt 602 passes. A suitable take-up roller 624 is provided. The roller at the tail end of the belt 602, not shown, is fixed in relation to the head end of the turning belt 505, and upon adjustment of the frame 707a, the take-up roller 624 is suitably adjusted. The arrangement shown in FIG. 10 insures that the head end of the keying conveyor belt 602 maintains a constant relationship with the tail of the sorting conveyor despite adjustment of the sprockets 708 to take up slack in the sorting conveyor runs. The drive mechanism for the belt 602 drives it at the same speed as the sorting conveyor.

As shown in FIG. 1 a pair of photocells and their associated energizing lamps are arranged along the keying conveyor 602 with each photocell being indicated at PER–10 and PER–20. The photocells and their associated energizing lamps are arranged to provide a pair of article detectors for detecting packages traveling on the belt. The location of photocell PER–10, herein referred to as the keying photocell, is at the same distance from the point of article transfer from the keying conveyor to the sorting conveyor as the lineal distance between such point of transfer around the tail end of the sorting conveyor to the preposition switch 739. Photocell PER–20 is located a distance ahead of PER–10 equal to substantially the length of a diverter boot. PER–20 is herein referred to as the late-key photocell. As a package to be diverted passes by the operator's station 606 the operator keys the destination or discharge station information into the control system by pushing buttons or the like in the keying console. If the package information has not been keyed into the system by the time the package interrupts the light beam falling on the late-key photocell, no destination signal will enter the memory system. This will in turn cause the package to pass down the full length of the sorting conveyor without being discharged at any of the discharge stations A through L, and the package will be recirculated to the accumulating area on the recirculation conveyor 800.

In the prior art various analog memory control systems are suggested but we have found all such that we are aware of to have certain disadvantages rendering them unsatisfactory. We have disclosed herein what might be considered a digital memory control system which is very satisfactory. It is based on the concept that the sorting conveyor itself is used to store the destination information for each package moving on it to be sorted, rather than storing the information in an analog device as in the prior art. This digital or escort memory control avoids the problems inherent in analog systems of insuring constant timed movement between the sorting conveyor and the analog device as well as the difficulties of amplified error resulting from malfunctions of the analog, and adjustment of the analog device should error in synchronous movement of the conveyor and analog device occur. The escort system herein disclosed is also easier to maintain.

All memory information, such as the number of boots to be diverted at any given station, and other destination or discharge station information, is stored in the control system by selectively magnetizing the thru-rods 719 of the sorting conveyor. The thru-rods are of a high-carbon steel which will allow a magnetic charge to be placed on them and subsequently erased. As shown schematically in FIG. 25, a thru-rod 719 in the article supporting run has been magnetized at four points or channels along its length as at 632a. A greater or lesser number of channels or points may be magnetized as desired or required. Each of these points is a magnetic charge of determined polarity. The charge is placed on the thru-rods by what is termed a writer. Two such writers are provided adjacent thru-rods as they near the tail end of the sorting conveyor on the return run, as shown in FIG. 11. One such writer may be termed a destination writer and is indicated at 633, and the other may be termed a stop writer and is indicated at 634. These two writers are arranged to write, or magnetize, selected thru-rods when input information is fed to them. In addition to the writers, erasers are provided adjacent the thru-rods on the return run of the sorting conveyor, and the erasers are indicated at 635 in FIG. 11. The erasers reversely polarize the magnetized points of the thru-rods to erase the signal previously applied to the rods. Three are provided to insure complete erasing. In addition to the writers and erasers there is a read-to-write writer 636 and a read-to-write reader 637. The first impresses a magnetic signal on each thru-rod, and the latter detects the signal, thereby responding to the presence of a thru-rod. The detector 637 is located at a distance ahead of the writers 633 and 634 equal to a function of the distance between successive thru-rods. The purpose of the detector 637 is to insure that the magnetic signal is written by the writers 633 and 634 only when a thru-rod is in a position to receive the magnetic signal.

Adjacent the thru-rods on the article supporting run are a series of readers, one for each discharge station, with two such readers being indicated at 638 and 639 in FIG. 17, the former being associated with discharge station C and divert switch 734 and the latter with discharge station D and divert switch 735. The readers are disposed ahead of their respective divert switches a distance which is a function of the distance between the writers and the preselector switch 739 so that the readers will detect the signals stored on the thru-rods in proper relation to the divert switches to cause the switches to divert the boots and in turn the articles at the proper positions of the articles in relation to the discharge stations to effect article discharge in relation to each station similar to that shown in FIGS. 2–7.

The readers, writers and erasers are supported in determined proximity to the thru-rods on supporting sleds which are wiped by the rods. Examples of the sleds are shown in FIGS. 25 and 26. All sleds are of the same construction and a description of one will therefore suffice for all. Each sled includes a sled-shaped plate 640 whose curved end 641 faces the approaching thru-rods. Side plates 642 and 644 are secured to the plate. A parallelogram linkage 646 and 648 pivotally connected to the side plates and to a supporting base 650, maintains the sled in proper parallelism with the path of the thru-rods. Springs 652 and 654 connected to the base and to the sled side plates urges the sled toward the thru-rods so that they wipe the sled plate 640 as they pass by the sled. The reader, writer or eraser array containing the magnetizing or magnetic signal detectors are carried by the sled as at 656, and are secured thereto in any suitable fashion. By this sled arrangement the air gap between the array and the thru-rods is maintained constant despite slight vertical variations of the thru-rods as they pass the array because the sled rides the rod. Maintenance of a constant air gap is important to proper operation of the magnetic writer and pick-up arrays.

In operation of the control system, as an article to be sorted travels past the operator's station on the keying conveyor 602, the operator by pressing two keyboard buttons in succession will energize corresponding tens and unit relays in the group CR–0 to CR–90 shown in FIG. 29. For example, pressing the 5 button and then the 7 button on the keyboard will energize the keyboard relays CR–50 and CR–7. CR–K will also be energized when a station or destination code is entered. The keyboard relay's signal is then translated to the relay contacts feeding the translator and encoder and the output of the latter is a signal which is delivered to the code writer 633 and stop writer 634, as represented by the code writer relays ER–1 through ER–7. Six channels may be written on the thru-rods by the code writer 633 of the embodiment shown to accommodate the number of discharge stations involved with the sorter conveyor. While discharge station information is written by the writer 633, the stop writer 634 writes a stop code on the thru-rod just preceding the rod on which the writer 633 writes the destination code information. By virtue of this, the rod bearing the stop divert code will reach a reader which is causing boot translation across the conveyor to stop the translation before the succeeding article is unintentionally diverted at such station. The result is to provide a "dead" boot, such as boots 721a and 721b between successive groups of boots. While such boot will be inoperative to cause article discharge, it insures a space between successive groups of boots that prevents accidental overlap of one group of boots with articles either just ahead or behind such group.

If the particular package being coded on the thru-rods is to be diverted to a discharge station along one side of conveyor, ER–7 is energized, or if the package is to be diverted to a station along the other side, ER–7 is de-energized. Relay ER–7 has contacts which correspond to those shown in FIG. 31 for controlling solenoids that cause opeartion of the preselector switch 739.

The internal operation of the translator and encoder may be performed electronically as will be understood by those skilled in the art, and the details of the writer, reader and eraser arrays for impressing, reading or erasing magnetic signals on the thru-rods will be similarly understood and therefore is not here described in detail. However, certain details in the operation of the circuitry shown may be useful. Relay K–2, which responds to the read-to-write reader (detector 637) energizes and de-energizes for every slat that passes the writing stations. When a code has been keyed in, and PER–10 is interrupted while no thru-rod is at the writing station, CR–ST (write start divert code) is energized. The next thru-rod that is in position to be magnetized, as determined by K–2, energizes CR–W (write relay), which turns on the direct current writing current and magnetizes the thru-rod with the polarity as determined by the ER relays that were energized. While the writing current is turned on, relay K–1 is energized, latching LR–2. While the start divert code is being written, a stop divert code is written one slat in front of the start code to stop the diversion of the preceding package as heretofore mentioned. Also, if ER–7 is energized, LR–4 is latched, presetting the boots to the right-hand side of the conveyor for a divert left package. The leading edge of the package is transferred onto the sorting conveyor on the same slat as the first pre-set boot.

After the thru-rod has left the writing station, K–2 is de-energized which de-energizes CR–W, turning off the writing current. The writing current de-energizes K–1, latching LR–EW (end of writing relay), which assures relays CR–W, CR–ST and CR–SP cannot be energized again immediately. When LR–EW is latched, CR–EW is energized which energizes CR–C (cancel keyboard code), dropping out the tens and units relays, CR–K, and the ER relays. CR–C, in turn, unlatches LR–2, which de-energizes CR–EW, de-energizing CR–C. The code for the next package, if there is one, may be entered into the keyboard at this time.

At the same time, LR–1 was latched, LR–3 was also latched. LR–3 started TDR–1 timing. As the first package leaves PER–10, LR–1 is unlatched, which unlatches LR–EW. Now CR–W can again be energized when the leading edge of the next package interrupts PER–10. When the leading edge of the second package interrupts PER–20, LR–3 is unlatched, stopping and re-setting TDR–1.

Late code packages are packages which are not keyed at all or keyed after the leading edge of the package has interrupted PER–20. The control circuit writes something for every package that interrupts PER–10. If no code is entered by the time the leading edge of the package interrupts PER–20, CR–LC (late code relay) is energized. CR–LC de-energizes all of the ER relays through the encoder circuitry. When the package enters PER–10, the sequence continues normally with CR–SP (write stop only) energized instead of CR–ST. A stop code is written for the preceding package one slat in front of the start code for the late code package. Because all of the ER relays are de-energized, a no divert code is written and the package will recirculate.

If a package is the last of a group and there is no package behind it to write a stop divert code, TDR–1 is allowed to time out, energizing CR–SP. A normal write cycle follows with a stop code written for the package.

In FIG. 27, which is a cross-sectional view substantially at 27—27 of FIG. 11, a safety switch arrangement is shown for stopping the sorter if for any reason a diverter boot follower 728 is not between the return guide rails or tracks 736 and 737. A pair of plates $P_1$ and $P_2$ carried by a rod R rotatably supported on the framework 707, are positioned to be struck by a stray follower and cause swinging of plate $P_1$ to actuate a switch SW connected in the motor control circuit for the motor driving the sorting conveyor. Another pair of switches SW–1 and SW–2, mounted on uprights 711, and similarly connected in the motor control circuit, will cause stoppage of the motor should either be contacted by a stray boot. This safety switch arrangement will prevent damage to the erasers and writers by stopping the conveyor.

*Summary*

In FIGS. 2 through 7 discharge of articles of varying shape and size at stations substantially opposite each other, and the advantage gained of causing lateral traverse of that number of boots corresponding to the distance between the leading edges of successive articles, as well as the necessity for adequate spacing between successive packages is illustrated.

The packages are caused to divert by traversing all the boots between leading edge of one and the leading edge of the next, less the dead boot. As A begins its diversion its effective length measured longitudinally of the conveyor increases such that the space between leading and trailing edges of packages A and B decreases. Without providing spacing between the packages which takes into account this decreasing distance between articles as a result of the angle of discharge, successive packages can reach an overlap condition which is destructive of them and the conveyor where they are to be diverted in opposite directions as shown in FIGS. 6 and 7. The tendency of particularly odd or round packages, as a can of paint lying on its side, to change position relative to the boots, makes desirable the traversing of boots corresponding to substantially the distance between the leading edges of successive articles, rather than merely those corresponding to the length of an article.

What is claimed is:

1. An article sorting conveyor for selectively diverting articles from either side thereof comprising: a conveyor having an article supporting run and a return run; article discharge stations arranged along opposite sides of the conveyor; a succession of article diverters carried by the conveyor to move therewith and each having a depending track follower for shifting the diverters laterally of the conveyor; means defining supporting run guide tracks beneath the article supporting run at opposite edges of the run for coacting with and guiding the followers longitudinally of the run; means defining cam tracks beneath the supporting run adjacent each discharge station and extending angularly across the run between the guide tracks for causing traverse of the followers from one guide track to the other at the stations to effect article discharge at the stations; return run guide track means cooperable with the followers and extending longitudinally of the return run, for guiding the followers during movement along the return run, and communicating with the guide tracks of the supporting run at the head and tail ends of the conveyor; preconditioning switch means in said return run guide track means for selectively switching followers to either supporting run guide track at the tail end of the conveyor prior to the diverters reaching the supporting run at such end of the conveyor; and a control system connected to said switch means for selectively operating it to cause switching of followers to one supporting run guide track or the other in accordance with the side of the conveyor at which the station is location where articles are to be discharged by the diverters of the followers so switched.

2. An article sorter comprising, in combination: a conveyor having a succession of article diverters mounted in longitudinal arrangement thereon for movement therewith and lateral traverse of the conveyor to discharge articles at selected stations along the conveyor; means cooperable with the diverters for selectively operating them to cause selected article discharge at said stations; mechanism for arranging articles in spaced apart relation and delivering them in such spaced relation to the conveyor; and a control system connected to said means and including article detectors for detecting articles being delivered to the conveyor and determining the distance between the leading edges of successive articles, and operable to cause lateral traverse of such number of successive diverters for the discharge of each article as substantially equals the distance between the leading edges of such article and the leading edge of the next succeeding article.

3. An article sorter comprising, in combination: a sorting conveyor having an article supporting run and a return run, article discharge stations arranged along opposite sides of the supporting run, a succession of article diverters mounted on the conveyor for movement therewith and selected traverse thereof at the stations from an initial position at that side of the supporting run remote from a selected station to the side of the run adjacent the station to divert an article into the station, diverter acuating means selectively operable adjacent each station for causing the aforesaid traverse of diverters; mechanism for delivering articles in longitudinally spaced relation to the supporting run at the tail end of the conveyor, and diverter prepositioning means cooperable with the diverters on the return run to selectively shift them to their said initial positions, prior to reaching the supporting run at the tail end of the conveyor, in accordance with the side location of the discharge station at which each article is to be diverted.

4. The invention defined in claim 3 wherein there is a control system for receiving and storing destination information as to the particular discharge station at which each article delivered to the supporting run is to be diverted, said control system coupled to said prepositioning means and said diverter actuating means, said control system including article detectors arranged to detect successive articles being delivered to the article supporting run and determine the distance between the leading edges of successive articles, and said control means operable in response to the input of destination information for each article and the determination of the distance between the leading edge of such article and the next succeeding article to cause such number of diverters to be prepositioned and subsequently to traverse the supporting run at the proper discharge station for each selected article as substantially equals said distance.

5. A switch for selectively diverting followers from an incoming track to either one or the other of a pair of outgoing tracks comprising: a diverter member pivotally mounted for swingable movement between two positions each providing a continuation of the incoming track with one of the outgoing tracks, and means connected to the diverter member to swing it as aforesaid including over-center locking mechanism tending to lock the diverter in either of said positions.

6. An auto-actuated diverting switch for selectively diverting followers from an incoming track to either of two outgoing tracks comprising: a switch point pivotally supported to swing between positions aligned with the incoming track and either outgoing track, means coupled with the point to swing it including a part shiftable into the path of a follower entering the switch and reacting to engagement with the follower to swing the point, and means selectively operable independently of a follower and connected to said part to swing it into the path of the follower.

7. In a sorting system having conveyor with a horizontal planar article supporting surface and discharge stations arranged at intervals therealong and article diverters carried by the conveyor and operable to traverse selectively the article supporting surface at the stations to positively divert articles horizontally therefrom into the stations, an escort memory control system including a keying station for receiving station discharge information for each article entering upon the conveyor and information signal storing means connected to and forming a part of the conveyor and moving therewith past the discharge stations, a writer connected to said keying station and positioned to impart station discharge information to said signal storing means, and a reader for each discharge station positioned to detect the stored signals on said signal storing means and each responsive to a determined signal to cause said diverters to divert articles at its station.

8. The invention defined in claim 7 characterized in that said control system includes a divert stop writer for imparting to said signal storing means a signal to stop divertor traverse of the conveyor after expiration of a determined time interval.

9. The invention defined in claim 7 characterized in that said control system includes an article detector for detecting an article about to enter upon the conveyor, and responsive to the absence of station discharge information as to such article after the article has approached to within a determined distance of entering upon the conveyor, to prevent said writer from imparting selected station discharge information to said signal storing means respecting such article.

10. The invention as defined in claim 7 characterized in that said control system includes a divert stop writer to cause a discontinuation of diverter traverse at each station, and article detectors are provided to detect the approach of articles to be entered on the conveyor, and responsive to the presence of an article at a determined position of approach to cause said stop writer to impart a stop diversion signal to said signal storing means for reading by readers prior to arrival of each article at a station at which diversion of a preceding article was occurring.

11. The invention as defined in claim 7 characterized in that article detecting means are provided for sensing the leading edges of successive articles approaching the conveyor and operable to cause said writer to impart discharge station information to said signal storing means to cause traverse of the conveyor by that number of diverters for each article diverted just short of the distance between the leading edges of successive articles.

12. A device for supporting a reader or a writer or a signal eraser in proximity to through rods of a slat conveyor comprising: a supporting base for rigid securement to framework of the slat conveyor, a sled having a curved end facing in the direction from which the through rods approach with the sled bearing against the rods during their passage relative thereto, means on said sled for supporting a writer or a reader or an eraser in determined position with respect to the surface of the sled wiped by the rods, paralleogram supporting links connected to the base and to the sled for supporting the sled in a position extending parallel to the direction of conveyor movement to be wiped by the rods and means for urging the sled toward and into engagement with the rods.

13. The invention as defined in claim 12 characterized in that spring means are provided tensioning the sled toward the rods.

14. A method of sorting and distributing a plurality of articles comprising: arranging the articles in determined spaced apart relation and passing them in such relation successively past a keying station, at the keying station selecting for each article a particular one of a plurality of discharge stations arranged along opposite edges of a sorting conveyor at which station the article is to be diverted and storing the discharge station information in a memory unit, causing a plurality of diverter boots associated with the sorting conveyor to be shifted to that side of the sorting conveyor remote from the conveyor edge at which each selected discharge station is located prior to each article to be diverted by the boots entering upon the sorting conveyor, moving each article onto the sorting conveyor in timed relation with its respective prepositioned boots, causing each article to move on the conveyor to its preselected discharge station according to the information stored in the memory unit, and causing the boots to divert each article at its selected discharge station.

15. The invention as defined in claim 7 characterized in that said conveyor is a slat type conveyor having through rods disposed beneath the slats, and the through rods comprise said signal storing means.

16. An auto-actuated diverting switch for selectively diverting followers from an incoming track to either of two outgoing tracks comprising: a switch point supported for movement between positions aligned with the incoming track and either outgoing track, means coupled with the point to shift it including a part disposed upstream of the point and shiftable into the path of a follower entering the switch and reacting to engagement with the follower to shift the point downstream of such follower to guide the follower to the other outgoing track, and means selectively operable independently of a follower and connected to said part to swing it into the path of the follower.

17. The invention defined by claim 16 characterized in that said means includes a spring biased lost motion linkage connected to said part and yielding to the pressure of a follower in the path of such part until such follower has passed by and thereafter urging said part into the path of the subsequent follower.

18. An article sorter comprising, in combination: an article spacer for spacing apart articles at least a predetermined minimum distance which is a function of the maximum width article to be handled by the sorter and the angle of discharge of articles from the hereinafter mentioned sorting conveyor, a sorting conveyor arranged to receive articles from the article spacer and convey them to and discharge them at preselected discharge stations arranged along opposite edges of the sorting conveyor, said sorting conveyor including a continuous succession of article diverter boots carried thereby and movable transversely thereof to effect article discharge, means responsive to the distance between leading edges of successive articles for arranging the boots in strings associated with each article to be discharged with the length of the strings varying with and being substantially equal to the distance between the leading edges of successive articles, said means responsive to the control system to arrange the strings at the edge of the sorting conveyor opposite the discharge station for each article whereby spaces are created between strings along one edge equal to the length of intermediate strings along the opposite edge, and means at the discharge stations responsive to said control system for causing strings of boots at one edge of the sorting conveyor to divert articles from the sorting conveyor through the said spaces between the strings at the opposite edge of the sorting conveyor.

19. A method of sorting and distributing a plurality of articles comprising: arranging the articles in single file succession, spacing them apart at least a predetermined minimum distance which is a function of the maximum width article to be sorted and the angle of discharge of the article from the file as hereinafter defined, moving the articles single file toward a succession of discharge stations arranged along opposite sides of the file and simultaneously positioning an article diverter adjacent each article on that side of the file opposite the discharge station at which the article is to be diverted, controlling the length of each diverter and the spacing apart of successive diverters along opposite sides of the file to provide spaces between successive diverters sufficient to allow articles diverted at acute angles to the file to move out of the file through such spaces without interference, moving the articles and the associated diverters to the discharge stations, and causing the diverters to divert articles from the moving file at an acute angle thereto at opposite sides of the file through the said spaces between successive diverters.

References Cited

UNITED STATES PATENTS

| | | | |
|---|---|---|---|
| 2,602,534 | 7/1952 | Hartmann | 198—31 |
| 2,868,394 | 1/1959 | Greller | 198—38 X |
| 2,969,137 | 1/1961 | Baumann | 198—38 |
| 2,984,366 | 5/1961 | Greller | 214—11 |
| 3,168,053 | 2/1965 | Miroux | 198—38 X |
| 3,250,375 | 5/1966 | Bonthuis | 198—34 X |
| 3,260,349 | 7/1966 | Meer | 198—38 |

EDWARD A. SROKA, *Primary Examiner.*